(12) United States Patent
Peterson et al.

(10) Patent No.: US 12,214,727 B2
(45) Date of Patent: *Feb. 4, 2025

(54) VEHICULAR EXTERIOR REARVIEW MIRROR ASSEMBLY WITH EXTENDABLE AND RETRACTABLE MIRROR HEAD

(71) Applicant: MAGNA MIRRORS OF AMERICA, INC., Holland, MI (US)

(72) Inventors: Kenneth C. Peterson, Ada, MI (US); Matthew V. Steffes, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,056

(22) Filed: Aug. 7, 2023

(65) Prior Publication Data
US 2023/0373392 A1 Nov. 23, 2023

Related U.S. Application Data

(63) Continuation of application No. 17/247,709, filed on Dec. 21, 2020, now Pat. No. 11,718,232, which is a continuation of application No. 16/291,006, filed on Mar. 4, 2019, now Pat. No. 10,875,454, which is a continuation of application No. 15/790,176, filed on Oct. 23, 2017, now Pat. No. 10,220,787, which is a
(Continued)

(51) Int. Cl.
*B60R 1/072* (2006.01)
*B60R 1/06* (2006.01)
*B60R 1/076* (2006.01)
*B60R 1/078* (2006.01)
*B60R 1/00* (2022.01)

(52) U.S. Cl.
CPC ............... *B60R 1/072* (2013.01); *B60R 1/06* (2013.01); *B60R 1/076* (2013.01); *B60R 1/078* (2013.01); *B60R 1/006* (2013.01)

(58) Field of Classification Search
CPC ......... B60R 1/006; B60R 1/072; B60R 1/074; B60R 1/076
See application file for complete search history.

(56) References Cited

U.S. PATENT DOCUMENTS

| 2,839,965 A | 6/1958 | Budreck |
| 4,278,227 A | 7/1981 | Davis et al. |
| 4,422,724 A | 12/1983 | Otsuka et al. |

(Continued)

*Primary Examiner* — Nicholas R. Pasko
(74) *Attorney, Agent, or Firm* — HONIGMAN LLP

(57) ABSTRACT

A vehicular exterior rearview mirror assembly includes a mounting arm configured for attachment at a side of a vehicle and a mirror head having a mirror reflective element. With the mounting arm attached at the side of the vehicle, the mirror reflective element is oriented to provide a driver of the vehicle a field of view rearward and sideward of the vehicle when the mirror head is in a retracted position and when the mirror head is in an extended position. With the mounting arm attached at the side of the vehicle, and when the mirror head is moved along the mounting arm, angle of the mirror head relative to the side of the vehicle at which the vehicular exterior rearview mirror assembly is attached adjusts to provide the driver of the vehicle the field of view rearward and sideward of the vehicle.

37 Claims, 34 Drawing Sheets

Related U.S. Application Data continuation of application No. 14/738,000, filed on Jun. 12, 2015, now Pat. No. 9,796,334.

(60) Provisional application No. 62/011,616, filed on Jun. 13, 2014.

(56) References Cited

U.S. PATENT DOCUMENTS

| | | |
|---|---|---|
| 4,502,759 A | 3/1985 | Herzog et al. |
| 5,182,676 A | 1/1993 | Iwai et al. |
| 5,371,659 A | 12/1994 | Pastrick et al. |
| 5,383,057 A * | 1/1995 | Kimura .................. B60R 1/066 359/874 |
| 5,467,230 A | 11/1995 | Boddy et al. |
| 5,477,390 A | 12/1995 | Boddy et al. |
| 5,483,385 A | 1/1996 | Boddy |
| 5,489,080 A | 2/1996 | Allen |
| 5,497,306 A | 3/1996 | Pastrick |
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,582,383 A | 12/1996 | Mertens et al. |
| 5,600,497 A | 2/1997 | Leonberger |
| 5,669,699 A | 9/1997 | Pastrick et al. |
| 5,680,263 A | 10/1997 | Zimmermann et al. |
| 5,684,646 A | 11/1997 | Boddy |
| 5,701,211 A | 12/1997 | Perry et al. |
| 5,703,731 A | 12/1997 | Boddy et al. |
| 5,790,298 A | 8/1998 | Tonar |
| 5,793,543 A | 8/1998 | Kimura et al. |
| 5,823,654 A | 10/1998 | Pastrick et al. |
| 5,949,591 A | 9/1999 | Whitehead |
| 5,980,047 A | 11/1999 | Kogita et al. |
| 6,106,122 A | 8/2000 | Gilbert et al. |
| 6,116,743 A | 9/2000 | Hoek |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,213,609 B1 | 4/2001 | Foote et al. |
| 6,213,612 B1 | 4/2001 | Schnell et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,808 B1 | 8/2001 | Foote et al. |
| 6,276,821 B1 | 8/2001 | Pastrick et al. |
| 6,312,135 B1 | 11/2001 | Polzer |
| 6,315,419 B1 | 11/2001 | Platzer, Jr. |
| 6,325,518 B1 | 12/2001 | Whitehead et al. |
| 6,394,616 B1 | 5/2002 | Foote et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,467,920 B2 | 10/2002 | Schnell et al. |
| 6,497,491 B2 | 12/2002 | Boddy et al. |
| 6,499,850 B2 | 12/2002 | Waldmann |
| 6,502,970 B1 | 1/2003 | Anderson et al. |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| 6,698,905 B1 | 3/2004 | Whitehead |
| 6,916,100 B2 | 7/2005 | Pavao |
| 6,954,152 B1 | 10/2005 | Matthews |
| 6,981,774 B2 | 1/2006 | Dumont et al. |
| 7,012,729 B2 | 3/2006 | Tonazzi et al. |
| 7,070,287 B2 * | 7/2006 | Foote .................. B60R 1/074 359/841 |
| 7,080,914 B1 | 7/2006 | Boddy |
| 7,093,946 B2 | 8/2006 | Barve et al. |
| 7,093,965 B2 | 8/2006 | Veldman |
| 7,097,312 B2 | 8/2006 | Platzer, Jr. |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,267,449 B1 | 9/2007 | Boddy et al. |
| 7,314,285 B2 | 1/2008 | Ruse et al. |
| 7,354,165 B1 | 4/2008 | Ruse et al. |
| 7,370,983 B2 | 5/2008 | DeWind et al. |
| 7,455,414 B2 | 11/2008 | Duroux et al. |
| 7,510,311 B2 | 3/2009 | Romas et al. |
| 7,532,149 B2 | 5/2009 | Banko et al. |
| 7,626,749 B2 | 12/2009 | Baur et al. |
| 7,690,800 B2 | 4/2010 | Fukai et al. |
| 7,722,199 B2 | 5/2010 | DeWard et al. |
| 7,817,020 B2 | 10/2010 | Turnbull et al. |
| 7,883,224 B2 | 2/2011 | Onuki |
| 7,926,960 B2 | 4/2011 | Skiver et al. |
| 7,944,371 B2 | 5/2011 | Foote et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,179,586 B2 | 5/2012 | Schofield et al. |
| 8,194,133 B2 | 6/2012 | DeWind et al. |
| 8,237,909 B2 | 8/2012 | Ostreko et al. |
| 8,339,526 B2 | 12/2012 | Minikey, Jr. et al. |
| 8,366,285 B2 | 2/2013 | Reedman et al. |
| 8,465,161 B2 | 6/2013 | DeWind et al. |
| 8,508,831 B2 | 8/2013 | De Wind et al. |
| 8,602,575 B2 | 12/2013 | Negel |
| 8,730,553 B2 | 5/2014 | De Wind et al. |
| 8,786,704 B2 | 7/2014 | Foote et al. |
| 8,915,601 B2 | 12/2014 | Foote et al. |
| 9,067,541 B2 | 6/2015 | Sobecki et al. |
| 9,796,334 B2 * | 10/2017 | Peterson .................. B60R 1/06 |
| 10,220,787 B2 * | 3/2019 | Peterson .................. B60R 1/078 |
| 10,875,454 B2 * | 12/2020 | Peterson .................. B60R 1/076 |
| 11,718,232 B2 * | 8/2023 | Peterson .................. B60R 1/076 359/841 |
| 2006/0050018 A1 | 3/2006 | Hutzel et al. |
| 2006/0061008 A1 | 3/2006 | Karner et al. |
| 2006/0273232 A1 | 12/2006 | Lang et al. |
| 2007/0002477 A1 | 1/2007 | Whitehead |
| 2007/0139751 A1 | 6/2007 | Kuiper et al. |
| 2007/0285812 A1 | 12/2007 | Foote et al. |
| 2009/0040306 A1 | 2/2009 | Foote et al. |
| 2009/0243824 A1 | 10/2009 | Peterson et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0236388 A1 | 9/2012 | De Wind et al. |
| 2013/0107386 A1 | 5/2013 | Sobecki et al. |
| 2014/0005907 A1 | 1/2014 | Bajpai |
| 2014/0133044 A1 | 5/2014 | Mambourg |
| 2014/0285666 A1 | 9/2014 | O'Connell et al. |
| 2014/0376119 A1 | 12/2014 | Sobecki et al. |
| 2015/0097955 A1 | 4/2015 | De Wind et al. |
| 2015/0224930 A1 | 8/2015 | Foote et al. |
| 2015/0353018 A1 | 12/2015 | Sobecki et al. |

* cited by examiner

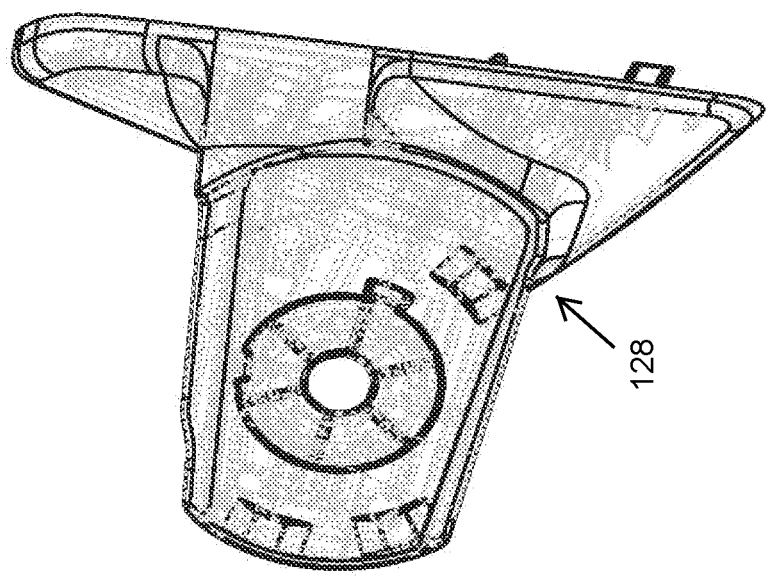
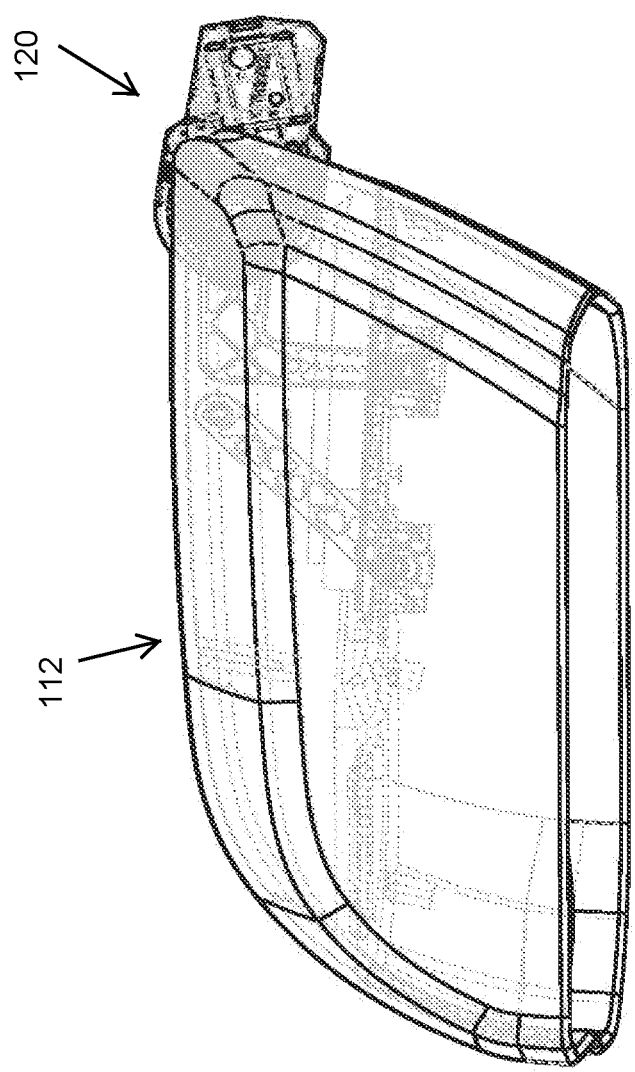
FIG. 21

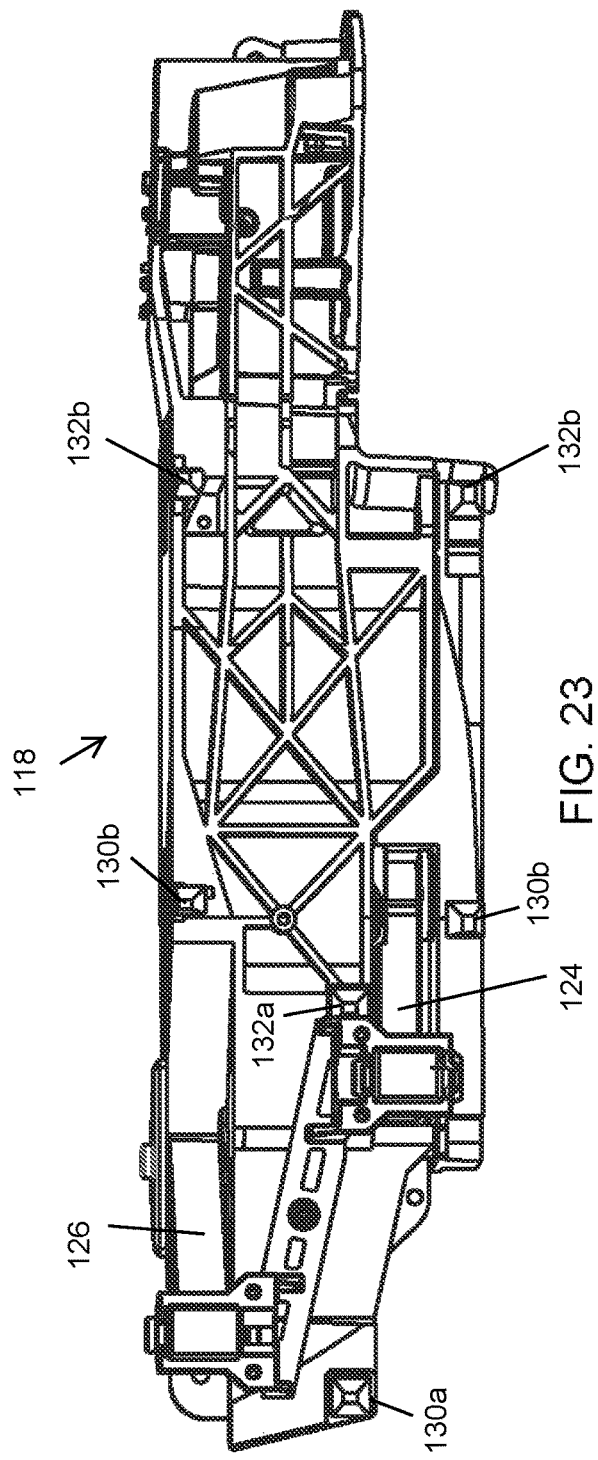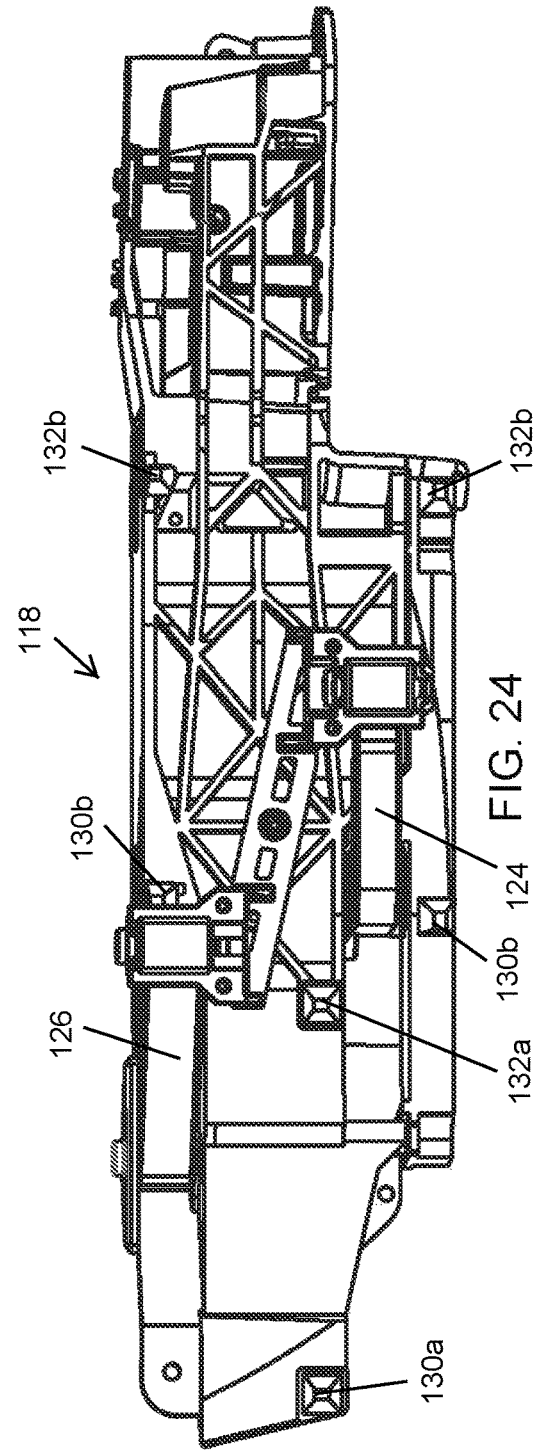

VEHICULAR EXTERIOR REARVIEW MIRROR ASSEMBLY WITH EXTENDABLE AND RETRACTABLE MIRROR HEAD

CROSS REFERENCE TO RELATED APPLICATIONS

The present application is a continuation of U.S. patent application Ser. No. 17/247,709, filed Dec. 21, 2020, now U.S. Pat. No. 11,718,232, which is a continuation of U.S. patent application Ser. No. 16/291,006, filed Mar. 4, 2019, now U.S. Pat. No. 10,875,454, which is a continuation of U.S. patent application Ser. No. 15/790,176, filed Oct. 23, 2017, now U.S. Pat. No. 10,220,787, which is a continuation of U.S. patent application Ser. No. 14/738,000, filed Jun. 12, 2015, now U.S. Pat. No. 9,796,334, which claims the filing benefits of U.S. provisional application Ser. No. 62/011,616, filed Jun. 13, 2014, which is hereby incorporated herein by reference in its entirety.

FIELD OF THE INVENTION

The present invention relates generally to the field of exterior rearview mirror assemblies for vehicles and, more particularly, to extendable and retractable exterior rearview mirror assemblies for vehicles.

BACKGROUND OF THE INVENTION

It is known to provide an automotive exterior rearview mirror assembly that may be extended and retracted, such as for trailer towing applications, where the mirror assembly may be extended to provide enhanced rearward viewing to the driver of the trailer pulling vehicle. Examples of extendable and retractable mirror assemblies are described in U.S. Pat. Nos. 5,483,385; 6,116,743; 6,213,609; 6,239,928; 6,276,808; 6,325,518; 6,394,616 and/or 6,497,491, which are hereby incorporated herein by reference in their entireties.

SUMMARY OF THE INVENTION

The present invention provides an exterior rearview mirror assembly (configured for mounting at a side of an equipped vehicle) that includes an extending/retracting mechanism and actuator that is operable to move the mirror head between a retracted position and an extended position. The actuator comprises a motor that is disposed at a mounting structure for mounting the mirror head at the side of the vehicle. The motor, when actuated, pivots a link that is connected between an inboard portion of the mirror head and the actuator, whereby pivotal movement of the link moves the inboard portion of the mirror head, which, in turn, causes pivotal movement of an outboard link, which is connected between an outboard portion of the mirror head and the mounting structure. The pivoting of the links swings the mirror head relative to the mounting structure while also pivoting or angling or canting the mirror head relative to the mounting structure and the side of the vehicle. For example, when the actuator moves the mirror head from its retracted state to its extended state, the mirror head may move outboard and may angle rearward and towards the side of the vehicle so that the reflective element is angled or canted towards the vehicle to provide enhanced viewing by the driver of the vehicle when in its extended state.

According to an aspect of the present invention, an exterior rearview mirror assembly for a vehicle includes a mirror head having a mirror casing and a mirror reflective element. A mounting arm is configured for attachment at a side of a vehicle, and the mirror head is adjustably mounted at the mounting arm. An adjustment mechanism is adjustable to adjust the mirror head position relative to the mounting arm between a retracted position and an extended position. The adjustment mechanism, when adjusting the mirror head position, also adjusts an angle of the mirror head relative to the side of the vehicle at which the exterior rearview mirror assembly is attached. When the mirror head is in the retracted position, a surface of the mirror head (such as a generally planar surface of the mirror reflective element or of the mirror casing or of a mounting plate or bracket of the mirror head) is at or in or generally parallel to a first plane, and, when the mirror head is in the extended position, the surface of the mirror head is at a second plane. The surface of the mirror head is angled more towards the side of the vehicle when in the second plane (when the mirror head is in the extended position) than when in the first plane (when the mirror head is in the retracted position).

The adjustment mechanism may comprise first and second linkages that pivotally mount or attach the mirror head at the mounting arm and that pivot to move or swing or adjust the mirror head between the extended and retracted positions. Optionally, the adjustment mechanism may include an actuator that, when actuated (such as via a user input at the vehicle), pivots one of the linkages to impart movement of the mirror head (and to impart pivotal movement of the other linkages as well). Optionally, the adjustment mechanism may provide for manual movement of the mirror head between the extended and retracted positions, whereby at least one of the linkages may engage detents to retain the linkage or linkages and the mirror head at the respective extended or retracted position.

Thus, the exterior rearview mirror assembly of the present invention provides an extendable and retractable mechanism that uses a rotatable-drive actuator, which may be similar in type to actuators used for powerfold mirror applications. The mechanism of the present invention extends the mirror head and also pivots or cants the mirror head slightly rearward and towards the side of the vehicle so that, when the mirror head is extended, the reflective element is adjusted to provide a better viewing angle to the driver of the vehicle, and thus avoids a further step or function of adjusting the mirror reflective element after it is extended (with the mirror head pivoting or angling back to its original state when the mirror head is retracted to also avoid the further adjustment of the reflective element when the mirror head is retracted), which is often required in known extendable/retractable exterior mirrors.

These and other objects, advantages, purposes and features of the present invention will become apparent upon review of the following specification in conjunction with the drawings.

BRIEF DESCRIPTION OF THE DRAWINGS

FIG. 21 is a top view of the extended exterior rearview mirror assembly of FIG. 18;

FIGS. 23 and 24 are side elevations of the mounting arm of the exterior rearview mirror assembly of the present invention;

DESCRIPTION OF THE PREFERRED EMBODIMENTS

Figure 1:
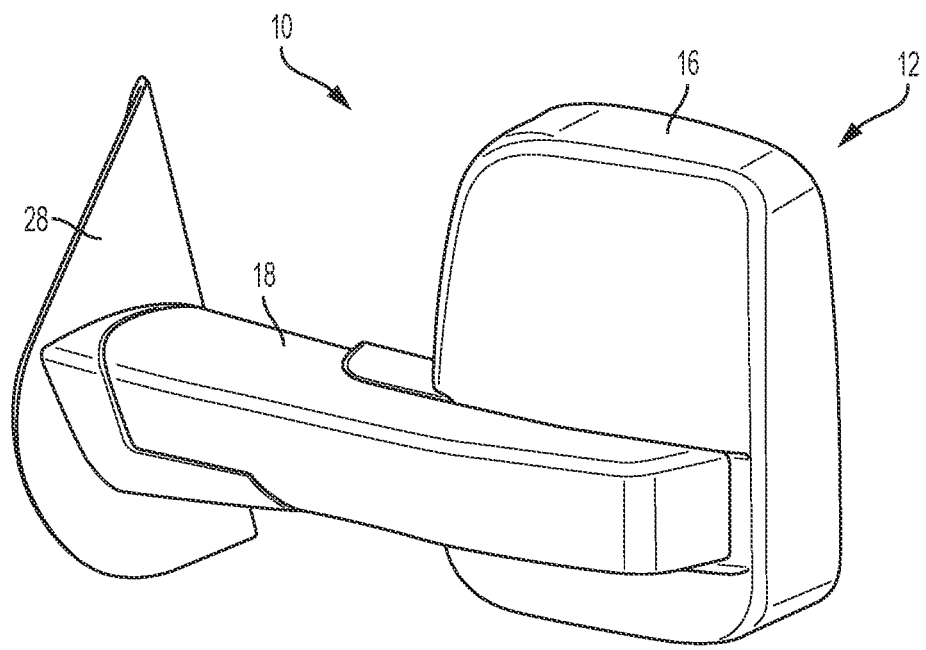
FIG. 1 is a perspective view of an exterior rearview mirror assembly in accordance with the present invention, shown in its retracted state.
Figure 2:
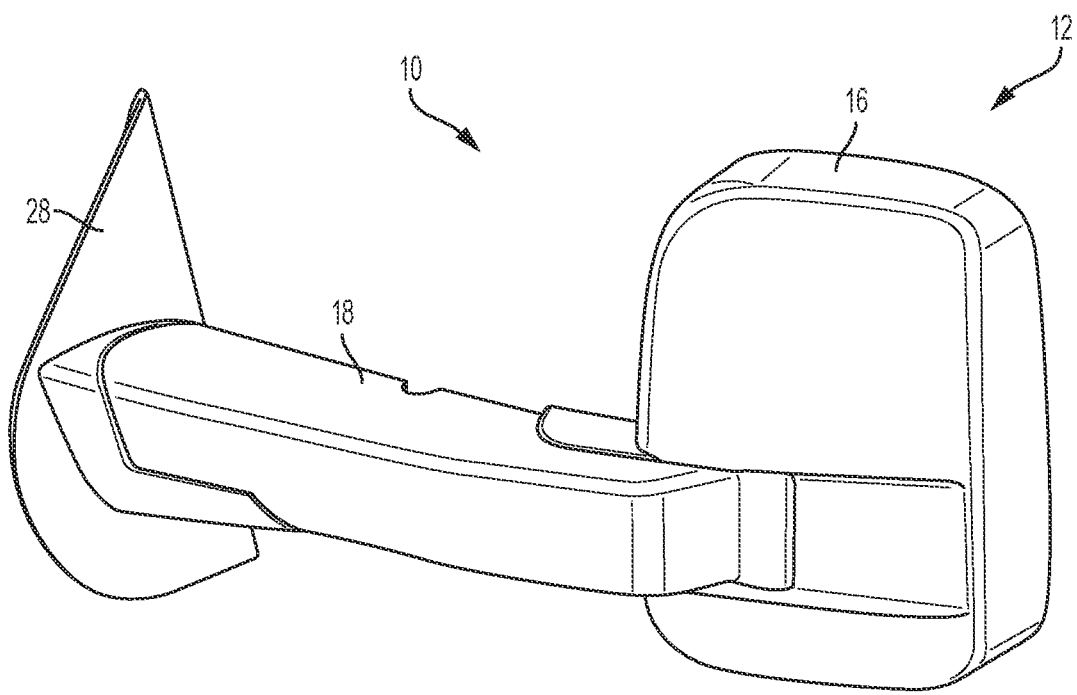
FIG. 2 is another perspective view of the exterior rearview mirror assembly of FIG. 1, shown in its extended state.
Figure 3:
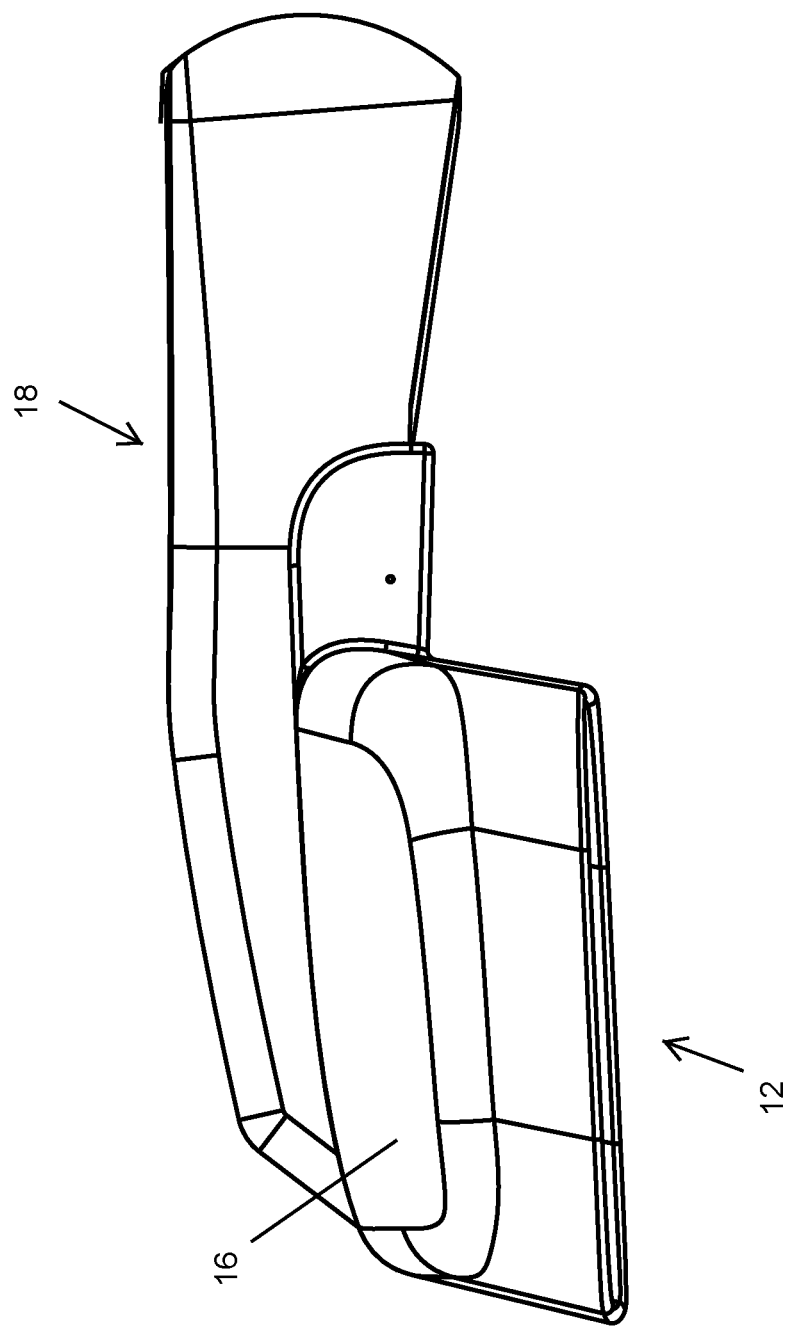
FIG. 3 is a top plan view of the exterior rearview mirror assembly of FIG. 1.
Figure 4:
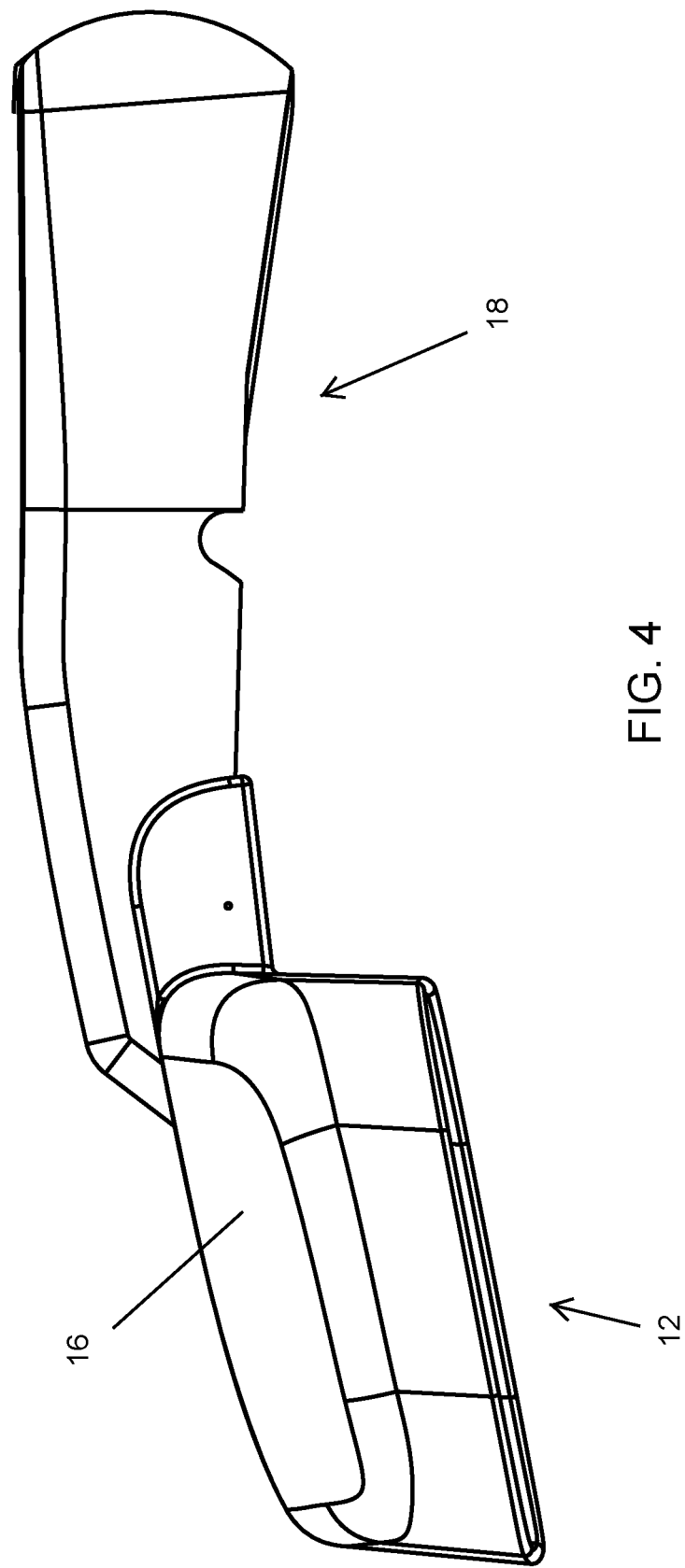
FIG. 4 is a top plan view of the exterior rearview mirror assembly of FIG. 2.

Referring now to the drawings and the illustrative embodiments depicted therein, an exterior rearview mirror assembly 10 for a vehicle includes a mirror head 12 having a mirror reflective element and a mirror shell or casing 16, with the mirror head being adjustably mounted at a mounting structure or arm 18 and adjustable via an adjustment mechanism or device 20 that adjusts the mirror head between a retracted state (FIG. 1) and an extended state (FIG. 2). The adjustment mechanism 20 includes a rotary actuator 22 that is operable to pivot an inner or inboard link 24 that is connected between an inboard portion or inboard mounting post or stanchion or pin of the mirror head and the actuator 22, which swings the inboard portion of the mirror head, which causes an outer or outboard link 26 (pivotally connected at one end to the adjustment mechanism or mounting arm and at the other end to an outboard mounting post or stanchion or pin of the mirror head) to swing or pivot an outboard portion (outboard of the inboard portion) of the mirror head, whereby the mirror head 12 is swung or swept or arcuately moved between the extended and retracted states, as discussed below. The lengths and mounting locations of the links 24, 26 are selected such that, as the mirror head is swung outwards to its extended position, the mirror head (and reflective element) pivot so as to be pivoted or canted rearward and inward so that the mirror reflective element is angled or canted towards the driver to provide an enhanced viewing angle to the driver, as also discussed below.

In the illustrated embodiment, the mounting structure 18 comprises an elongated arm that is pivotally mounted at a base portion 28, which is configured to attach at a side of a vehicle. The base portion of the mirror assembly is mounted at the side of a host or subject vehicle, with the reflective element providing a rearward field of view along the respective side of the vehicle to the driver of the vehicle.

In the illustrated embodiment, the mirror assembly comprises a powerfold mirror assembly that includes an actuator that is operable to pivot the mounting structure or arm and the mirror head relative to the base portion. The actuator may operate response to a user input to pivot the mounting arm and mirror head between a use position (as shown) and a folded position, where the arm and mirror head may be disposed generally along the side of the vehicle. Although shown as pivotally mounting at the base portion, such as for a powerfold mirror application (where the mounting structure or arm and the mirror head may be pivoted relative to the base portion via an actuator assembly or adjustment device) or breakaway mirror application, the mounting arm or structure may be fixedly mounted at a base portion or at the side of the vehicle.

Figure 7:
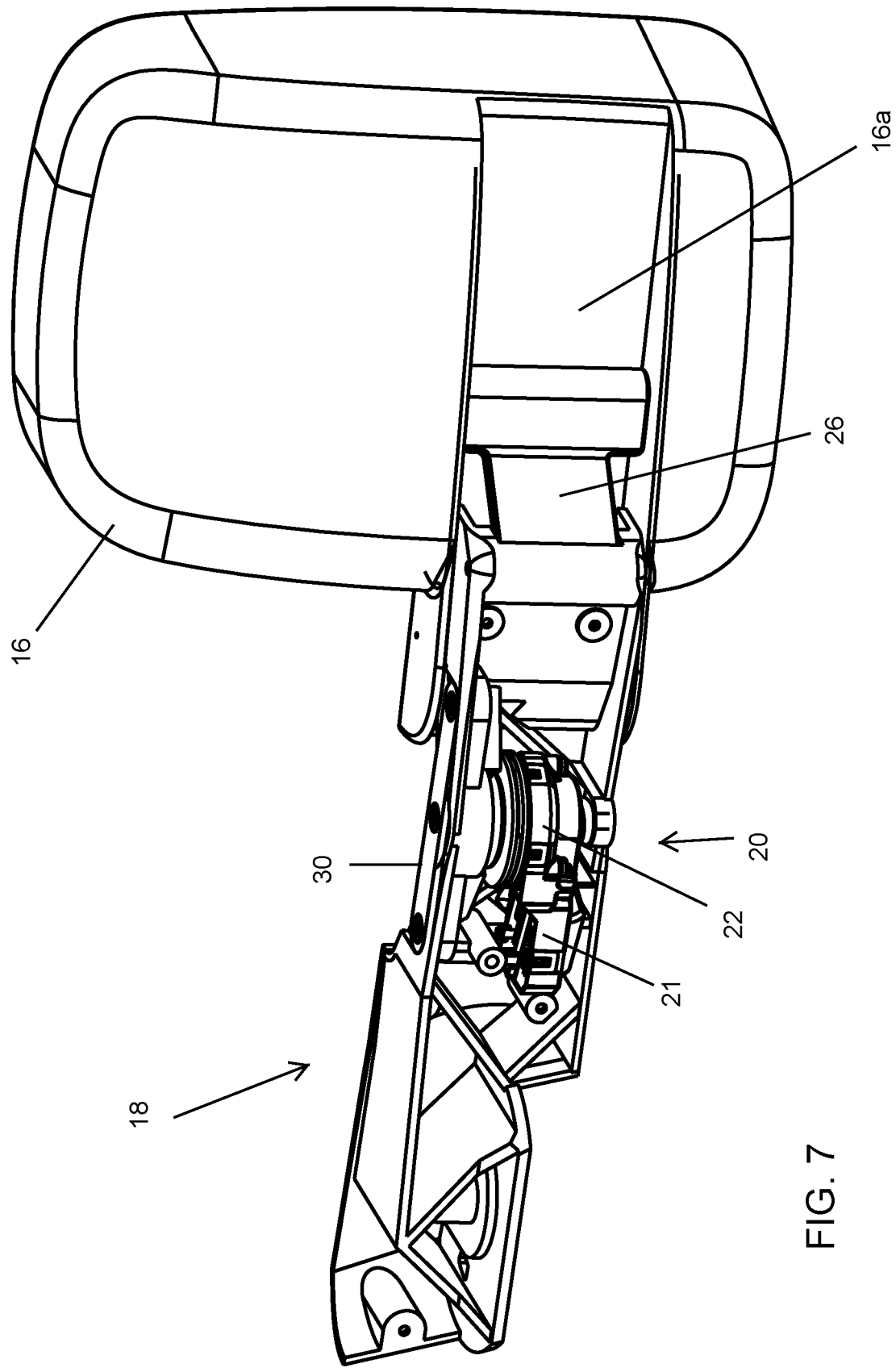
FIG. 7 is a perspective view of the exterior rearview mirror assembly of the present invention, with portions removed to show additional details.
Figure 8:
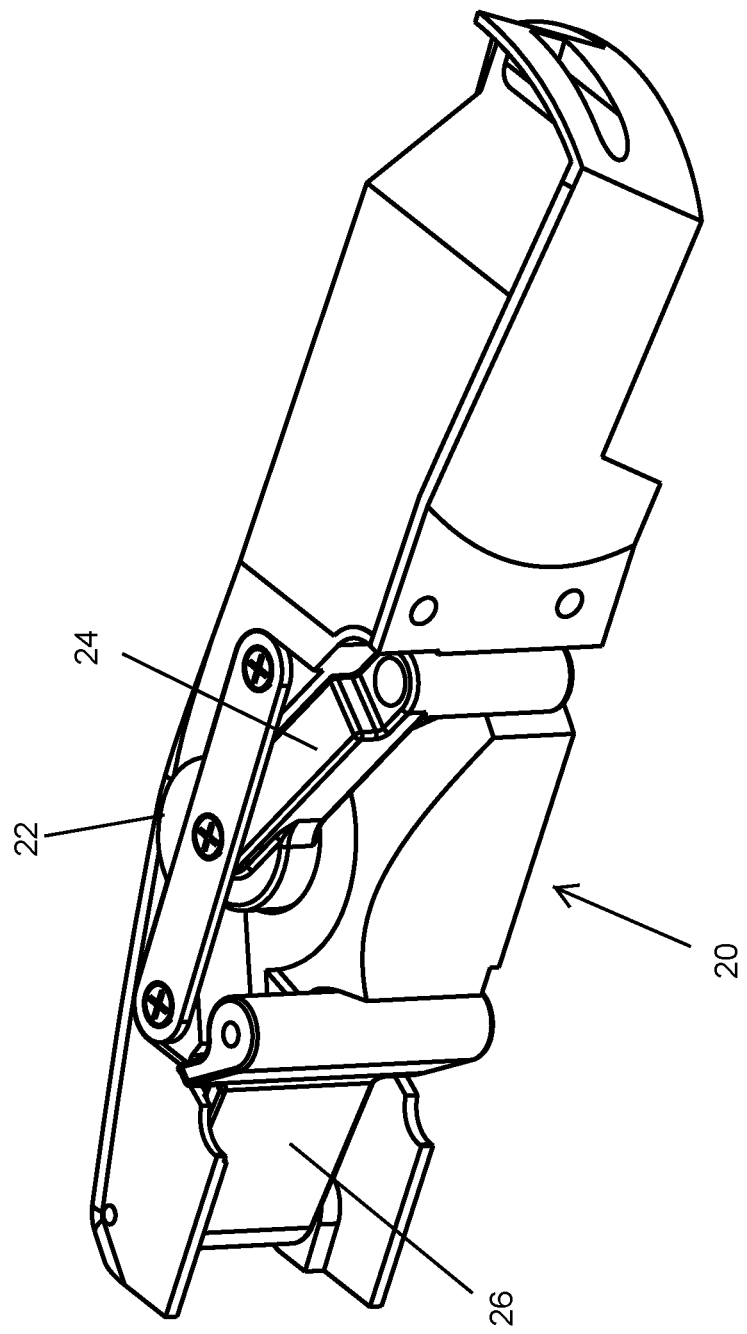
FIG. 8 is a perspective view of the extending/retracting mechanism of the exterior rearview mirror assembly of the present invention, shown in its retracted state.
Figure 9:
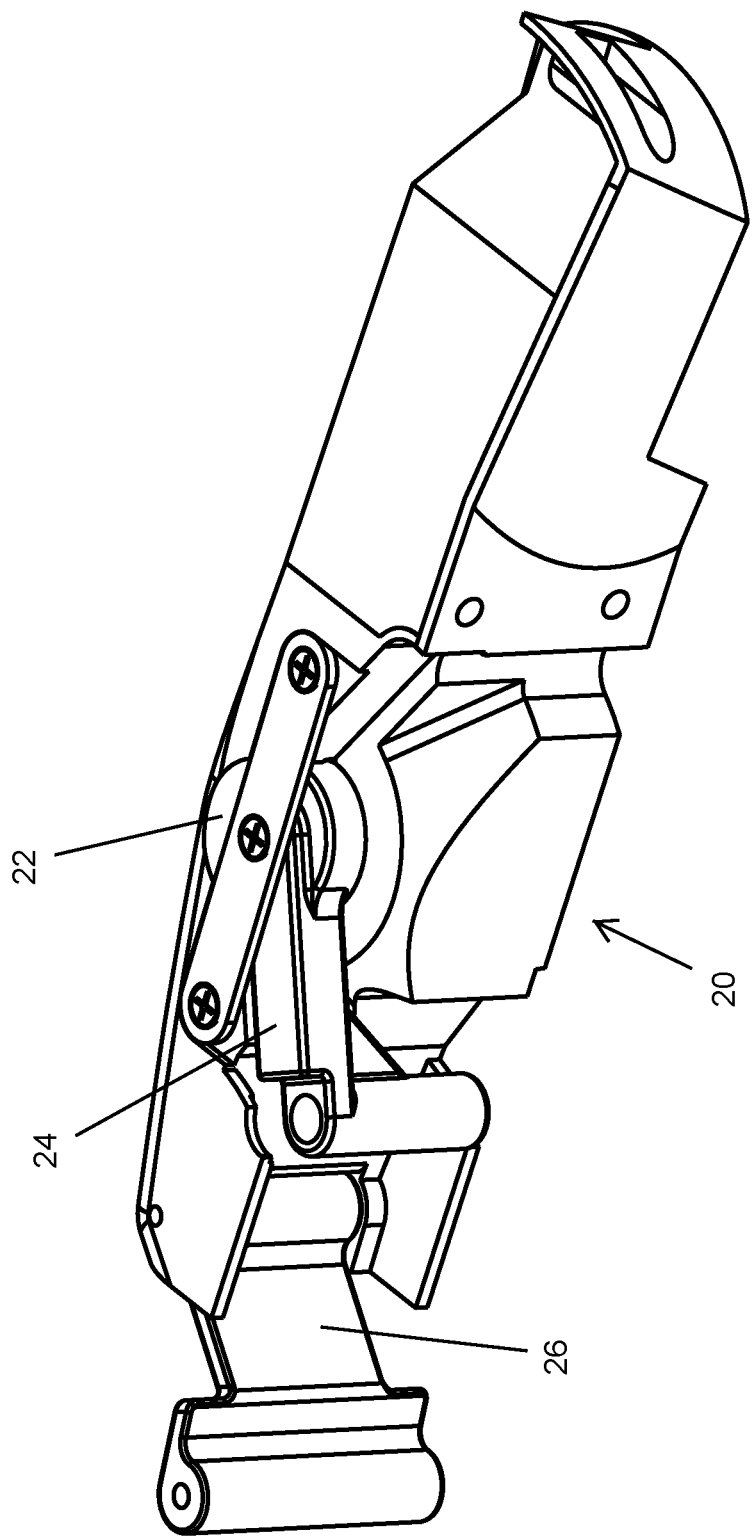
FIG. 9 is another perspective view of the extending/retracting mechanism of the exterior rearview mirror assembly of the present invention, shown in its extended state.

The mounting arm or structure 18 supports or houses the adjustment mechanism 20, and is formed so that the mirror casing of the mirror head engages or nests at the outer portion of the mounting structure when in its retracted position, and extends from the outer portion of the mounting structure when in its extended position, such as can be seen with reference to FIGS. 1-4. As shown in FIG. 7, the rear of the mirror casing 16 may include a channel or contour 16a that at least partially receives a portion of the mounting arm 18.

Figure 12:
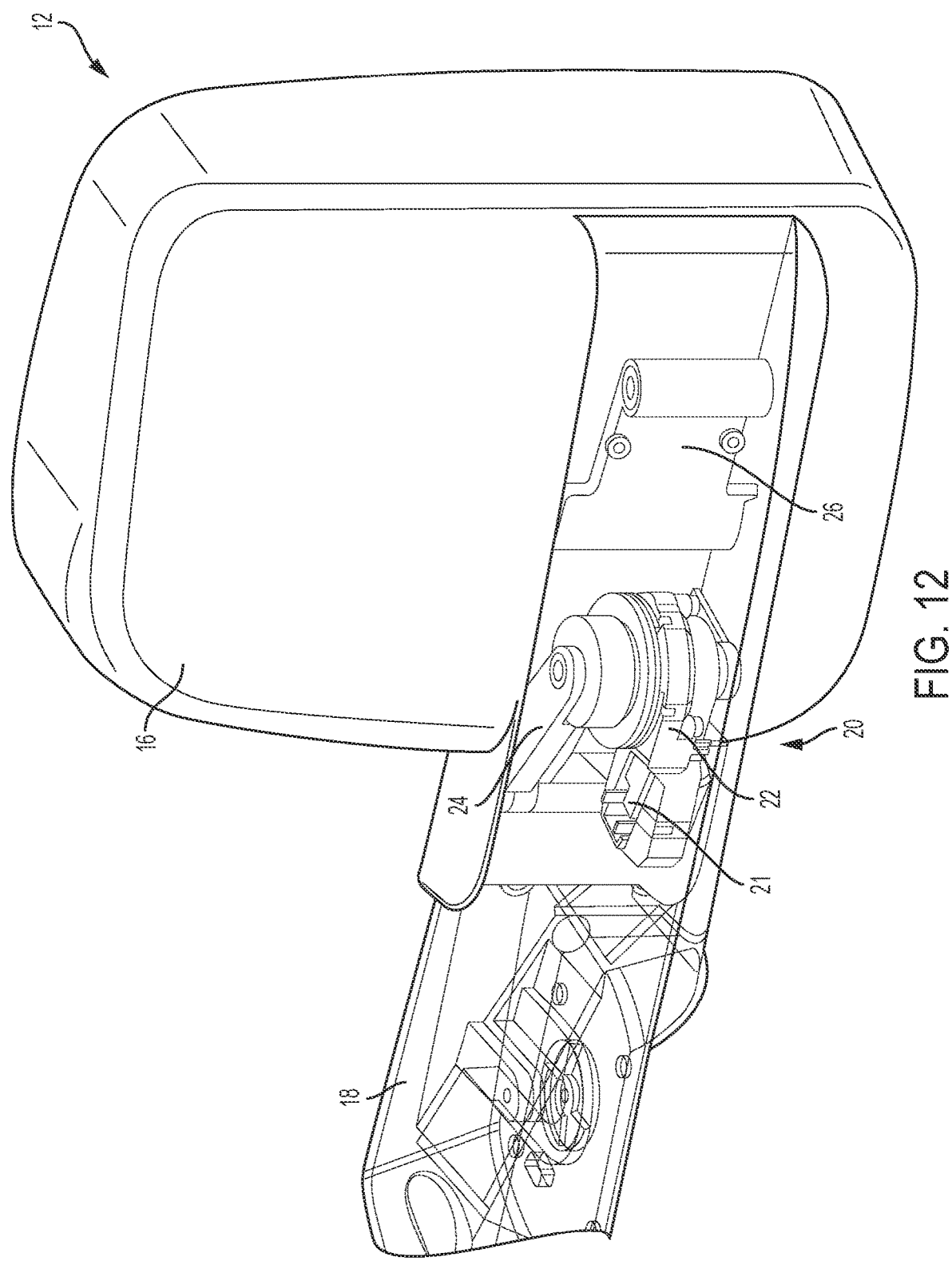
FIG. 12 is a partial perspective view of the exterior rearview mirror assembly of FIG. 1, with portions removed to show additional detail.
Figure 13:
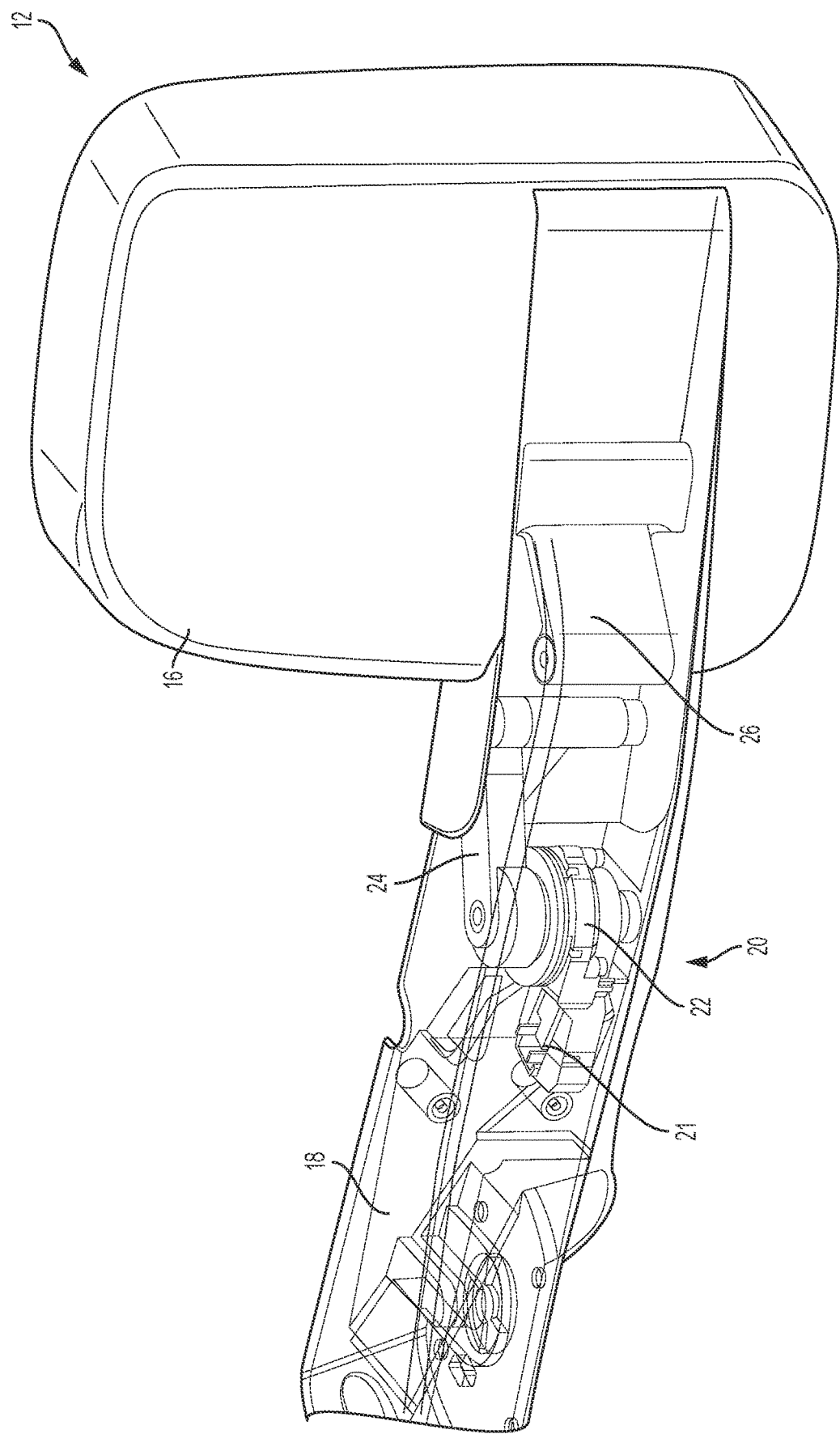
FIG. 13 is a partial perspective view of the exterior rearview mirror assembly of FIG. 2, with portions removed to show additional detail.
Figure 14:
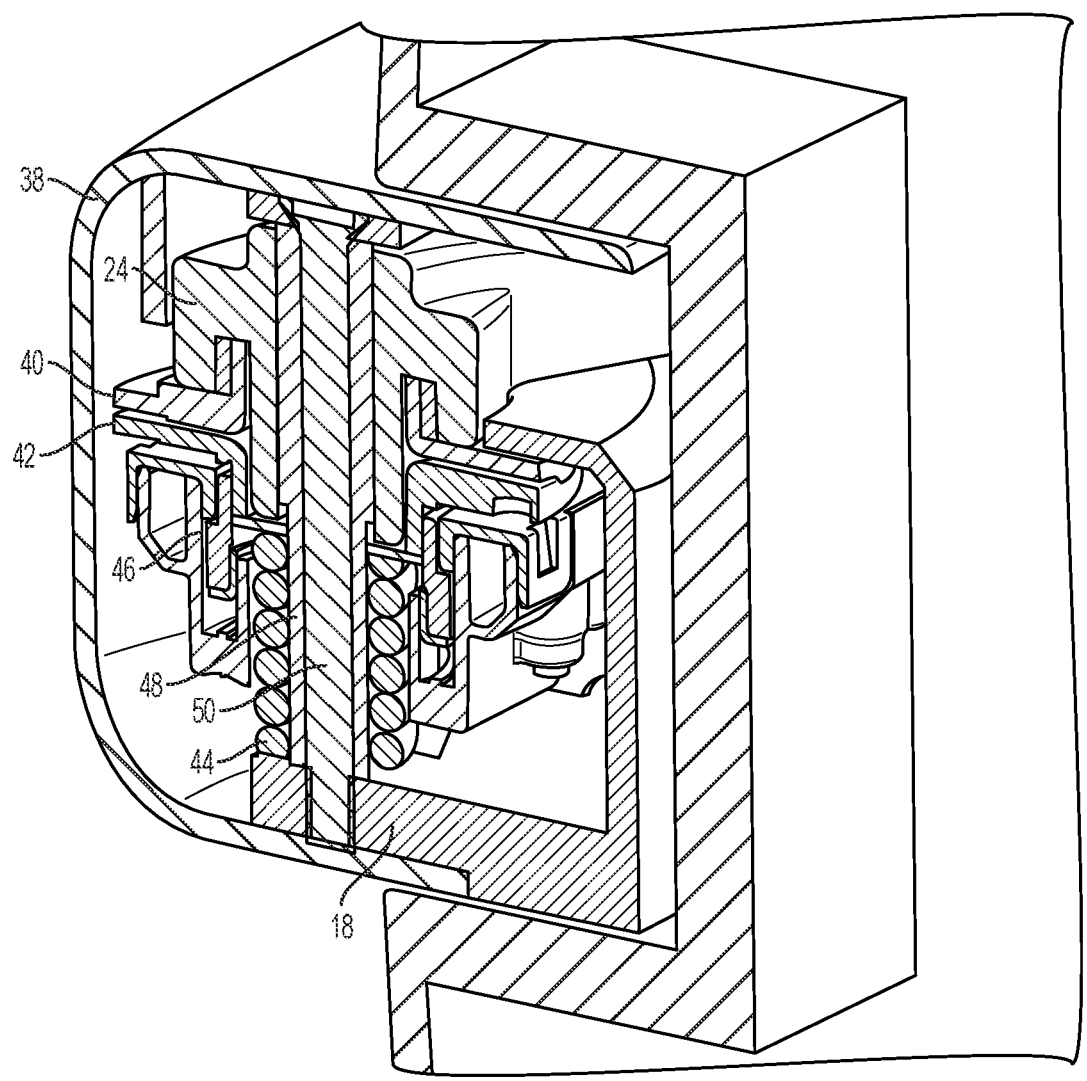
FIG. 14 is a sectional view of the actuator of the exterior rearview mirror assembly of the present invention.

The adjustment mechanism 20 is received in the mounting arm 18 and attached thereto, such as via a mounting bracket or brace 30 that may be attached to the mounting arm via one or more fasteners to retain the adjustment mechanism 20 and its actuator 22 at the mounting arm or structure 18 (such as shown in FIGS. 5-11). As shown in FIG. 14, the inboard link 24 is attached at the pivot shaft of the actuator, which has an output gear that is rotatably driven by an electrically powered motor 21 (FIGS. 12 and 13) of the adjustment mechanism to rotatably drive the pivot pin and inboard link. The actuator may include a detent plate that engages a link detent plate of the inboard link, such that the position of the link (and the mirror head) may stop at particular detent locations (retracted and extended positions) and the mirror head may be manually moved to those locations.

For example, and such as shown in FIG. 14, the actuator assembly includes a link detent plate 40 at the inboard link 24 and a manual detent plate 42 at the actuator and a detent spring 44 that urges the manual detent plate into engagement with the link detent plate. As can be seen with reference to FIG. 14, compression of detent spring 44 allows for disengagement of the detent plates 40, 42, which in turn allows for manual pivoting of the inboard link 24 (and the mirror head) relative to the mounting arm 18. As also shown in FIG. 14, the mounting arm includes an arm cover 38 to encase the adjustment mechanism within the mounting arm. In the illustrated embodiment, the adjustment mechanism includes an output gear 46 of the actuator or motor that imparts rotation of the outboard arm 24, which pivots or rotates a pivot sleeve 48 relative to a pivot pin or screw 50 (with the outboard arm 24 keyed to the sleeve so as to rotate therewith).

In the illustrated embodiment, the actuator 22 has the inner link 24 mounted at the actuator pivot pin, such that rotation of the pivot pin (such as via the drive motor rotatably driving the output gear of the actuator) rotates the inner link. The opposite end of the inboard link 24 is pivotally attached at the inboard portion of the mirror head, such as to a post or stanchion or pin at the rear of the mirror casing or inside the mirror casing. The outboard link 26 is pivotally mounted at one end to a post or stanchion at the outer end of the mounting arm 18 and at the other end at the rear of the mirror head at a location outboard of the inboard link mounting location.

Figure 10:
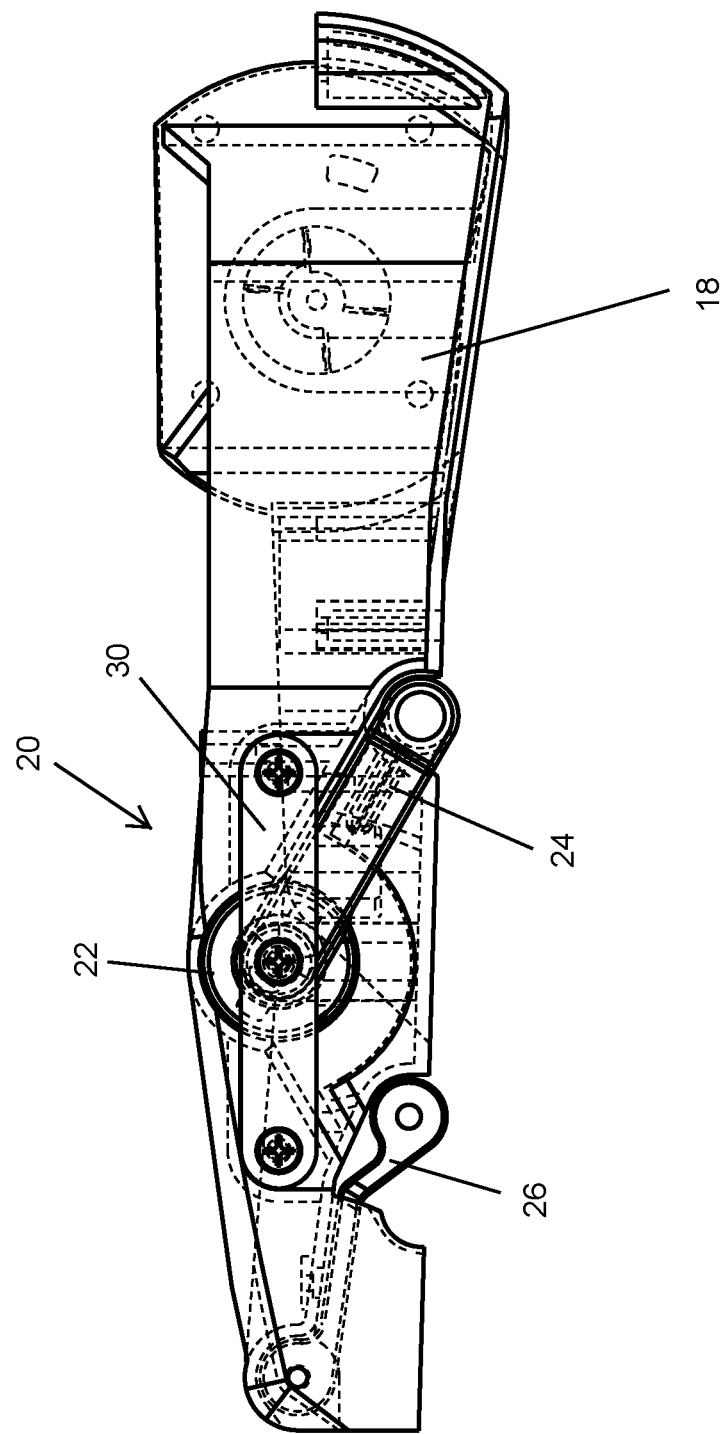
FIG. 10 is a top plan view of the extending/retracting mechanism of the exterior rearview mirror assembly of the present invention, shown in its retracted state.
Figure 11:
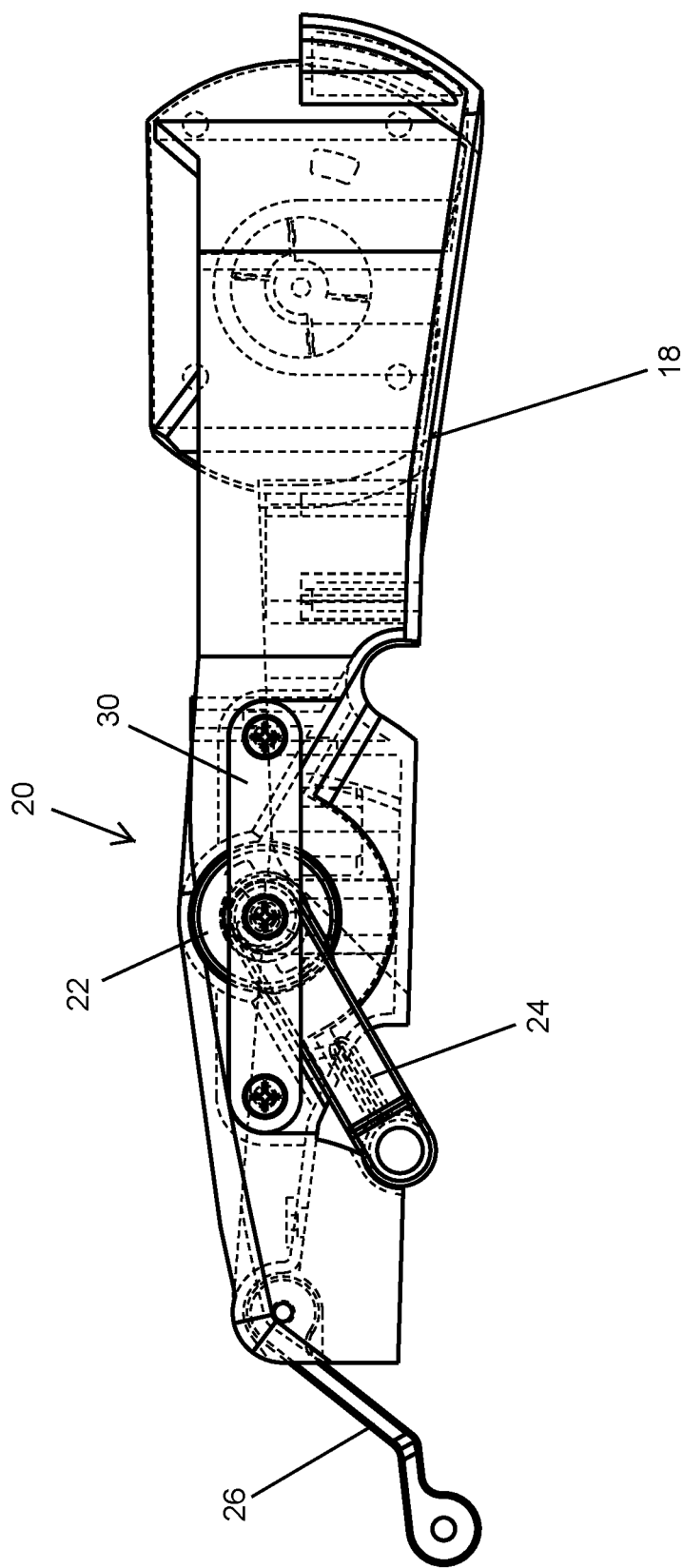
FIG. 11 is another top plan view of the extending/retracting mechanism of the exterior rearview mirror assembly of the present invention, shown in its extended state.

Thus, when actuated (such as via actuation of a user input by the driver of the vehicle) to move the mirror head from its retracted state to its extended state, the actuator pivots the inboard link 24, which moves the inboard portion of the mirror head, which imparts a corresponding movement of the outboard mounting region for the outboard link, which pivots relative to the mounting arm as the mirror head is moved. The mirror head thus swings or arcuately moves along the path of the outer ends of the links 24, 26 as they pivot about the actuator pivot pin and the outer end mount, respectively. The lengths and configurations of the links 24, 26 are selected such that, as the mirror head swings towards its extended state, the mirror head is angled or pivoted or canted rearward and towards the side of the vehicle, such as can be seen with reference to FIGS. 10-13 and 15. This is accomplished by selecting the mounting locations and stop points (where the mirror ends of the links contact recesses or stops at the mounting arm or actuator body, such as can be seen in FIGS. 10 and 11) for the links at relative locations so that the links do not pivot as opposite sides of a parallelogram, such that the mirror head (and thus the reflective element) does not stay parallel to its initial location when it is extended.

Figure 5:
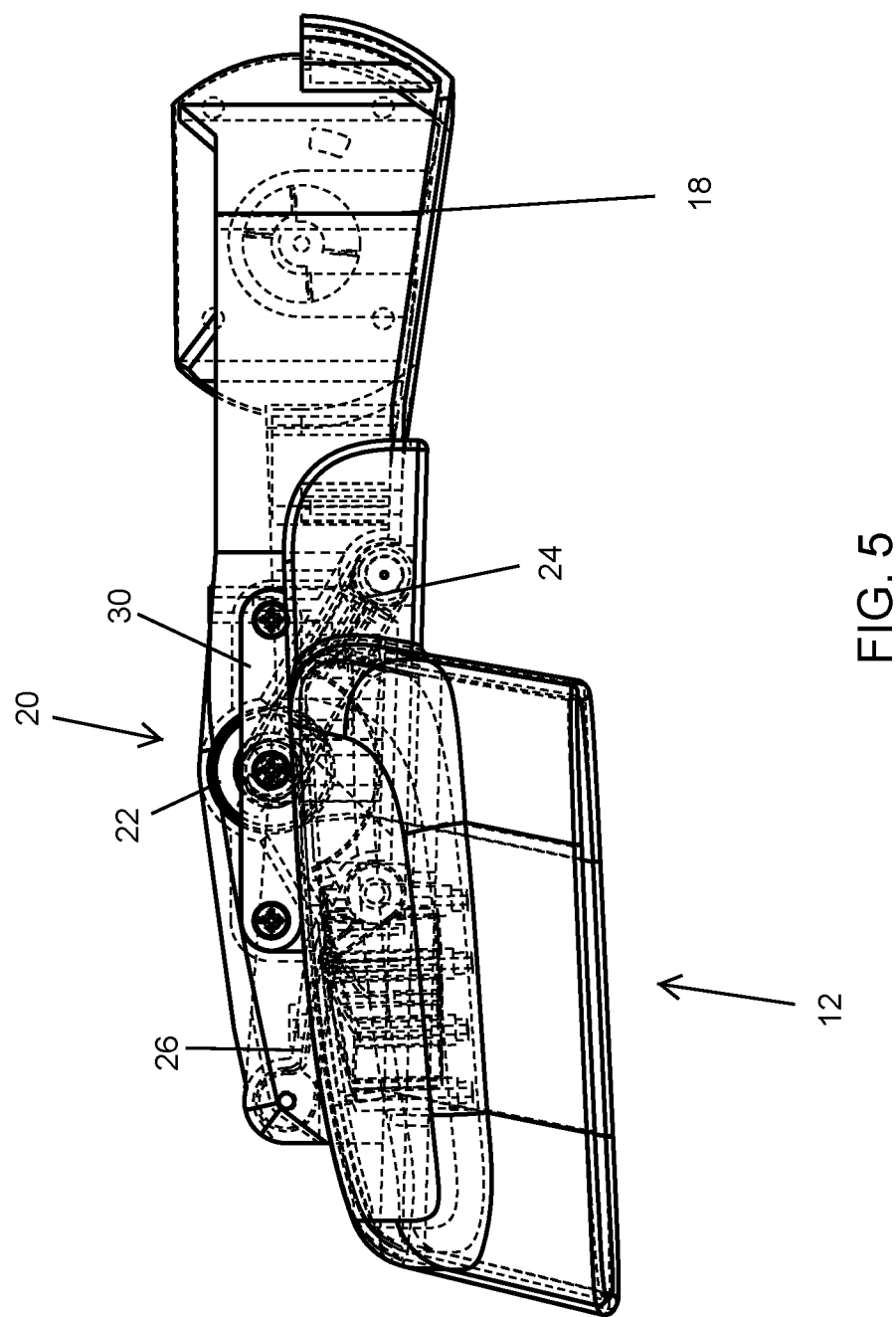
FIG. 5 is another top plan view of the exterior rearview mirror assembly of FIG. 3, with portions shown as transparent to show additional details.
Figure 6:
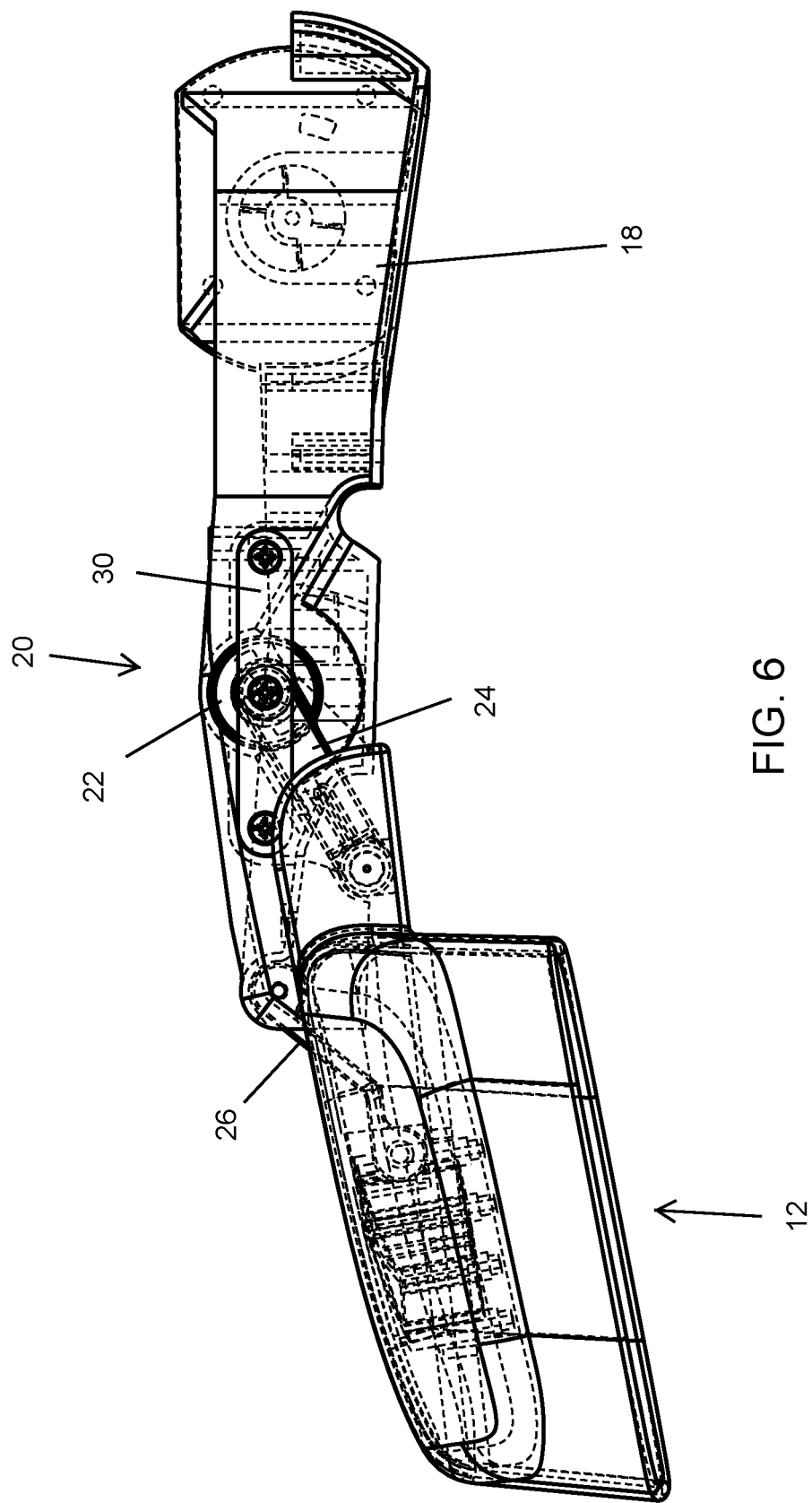
FIG. 6 is another top plan view of the exterior rearview mirror assembly of FIG. 4, with portions shown as transparent to show additional details.
Figure 15:
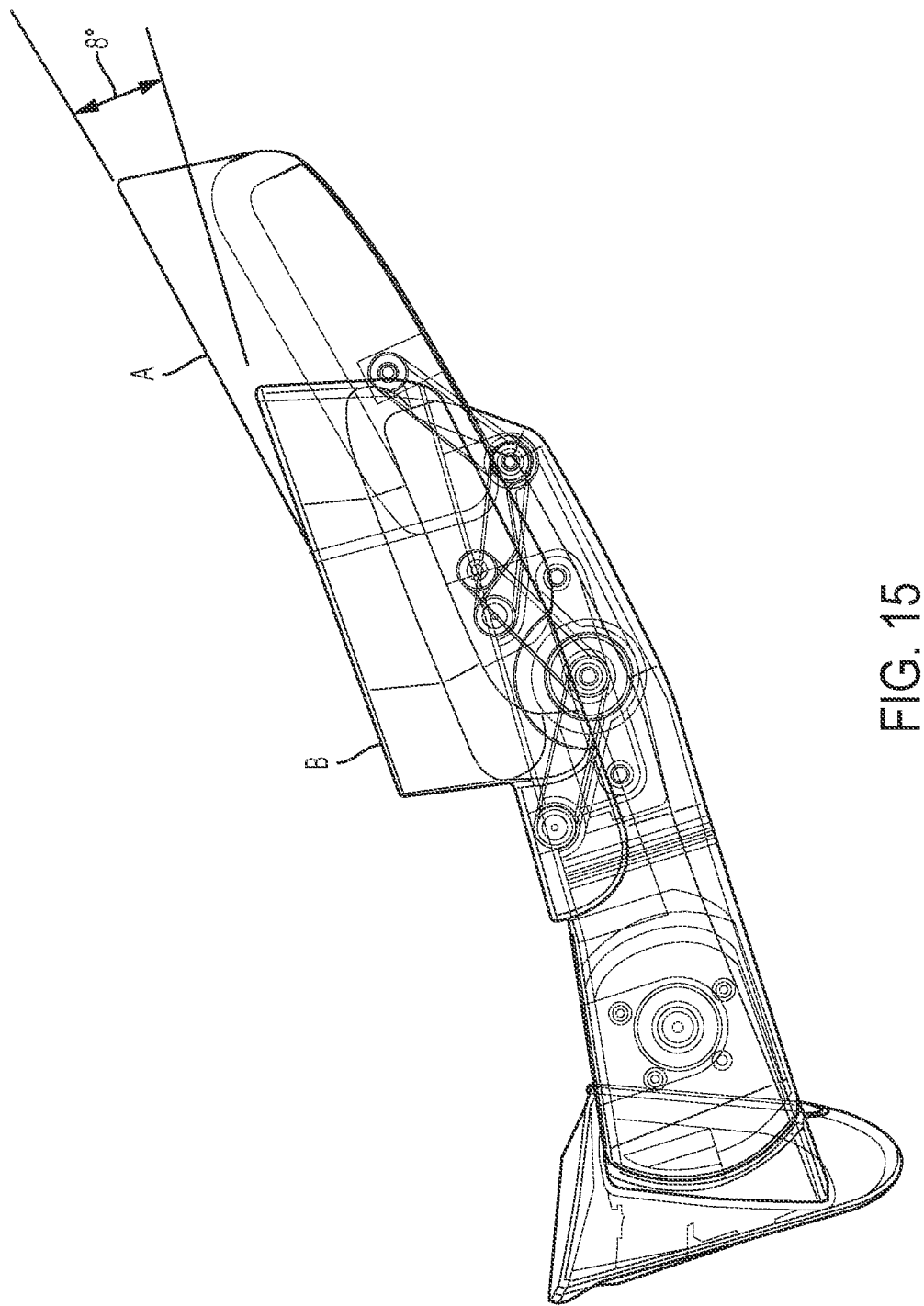
FIG. 15 is a top plan view of the exterior rearview mirror assembly of the present invention, shown in both its retracted and extended states, showing the degree of extension and angular adjustment of the mirror head provided by the extending/retracting mechanism of the present invention.
Figure 16:
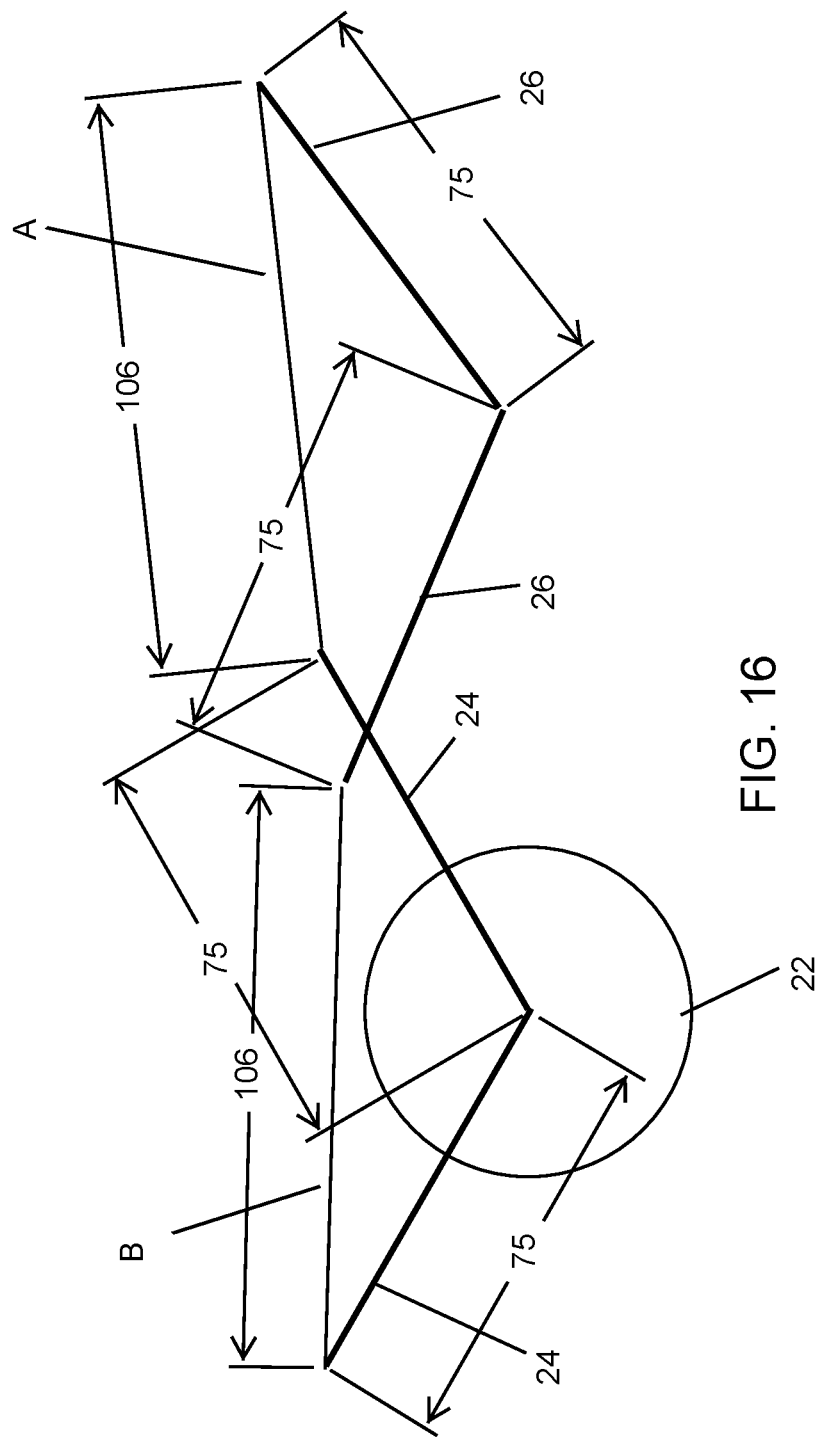
FIG. 16 is a schematic showing the pivotal movement of the links and mirror head.
Figure 17:
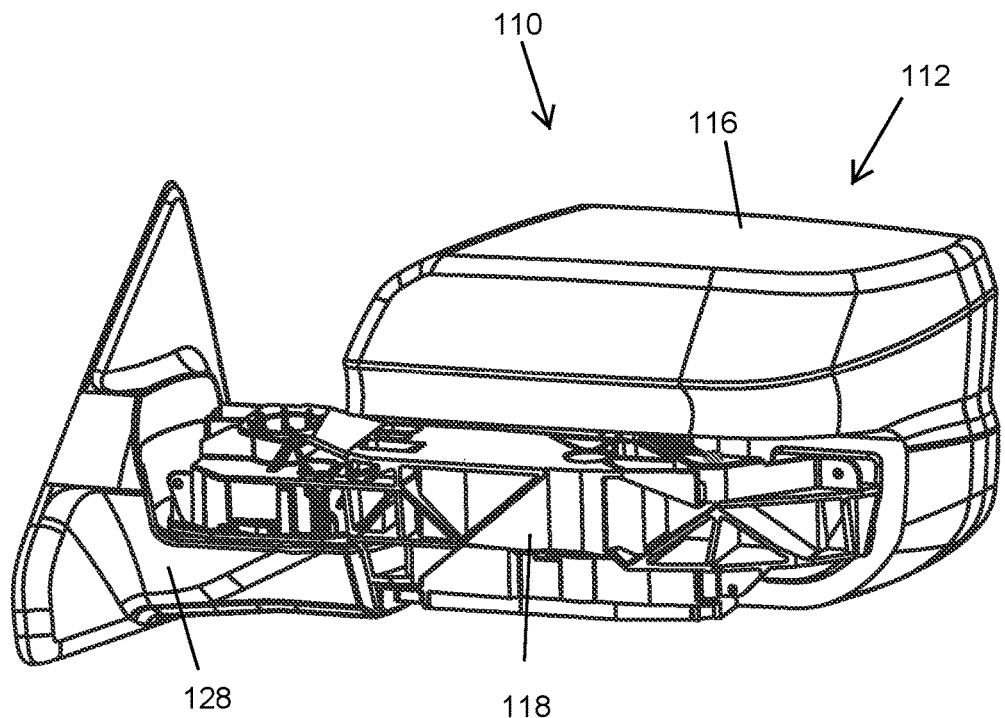
FIG. 17 is a perspective view of another exterior rearview mirror assembly of the present invention, shown in its retracted state.

As can be seen with reference to FIGS. 5, 6 and 15, the plane of the rear face or open end of the mirror casing is at a first angle relative to the side of the vehicle when the mirror head is in its retracted position, and is at a second angle relative to the side of the vehicle when the mirror head is in its extended position (thus the reflective element also is angled with the mirror head, without adjustment of the reflective element via actuation of a mirror actuator in the mirror casing). For example, and such as shown in FIGS. 15 and 16 (with FIG. 16 being a schematic of the links and mirror head as they pivot and move between the retracted and extended states), the mirror head, when it is extended may move outwards about 107 mm and may be angled or canted towards the side of the vehicle about 8 degrees, whereby a plane A of or generally parallel to the mirror reflective element or other surface of the mirror head when the mirror head is extended is canted towards the side of the vehicle more than a plane B of or generally parallel to the mirror reflective element or other surface of the mirror head when the mirror head is retracted (the term "plane" is used herein to generally define the location or angle of the reflective element and mirror head relative to the vehicle, and optionally the plane may correspond with the opening or rear edge or surface of the mirror casing or a surface of a generally planar attachment plate or bracket that attaches the mirror head to the linkages of the adjustment mechanism or the like). However, the degree of head extension and rotation or canting can be adjusted or selected by selecting different lengths for the links and different relative pivot mounting locations of the links, such as different relative mounting locations of the links at the mirror head and/or at the mounting arm.

Referring now to FIGS. 17-38 an exterior rearview mirror assembly 110 for a vehicle includes a mirror head 112 having a mirror reflective element and a mirror shell or casing 116, with the mirror head being adjustably mounted at a mounting structure or arm 118 and adjustable via an adjustment mechanism or device 120 that adjusts the mirror head between a retracted state (FIGS. 17, 20, 34 and 36) and an extended state (FIGS. 18, 19, 21, 35 and 37). The adjustment mechanism 120 includes a rotary actuator 122 that is operable to pivot an inner or inboard link 124 that is connected between an inboard portion or inboard mounting post or stanchion or pin of a bracket 123 of the mirror head and the actuator 122, which swings the inboard portion of the bracket 123 and mirror head 112, which causes an outer or outboard link 126 (pivotally attached at one end to the mounting arm and at the other end to an outboard mounting post or stanchion or pin of the bracket 123 of the mirror head) to swing or pivot an outboard portion (outboard of the inboard portion) of the mirror head, whereby the mirror head 112 is swung or swept or arcuately moved between the extended and retracted states. The lengths and mounting locations of the links 124, 126 are selected such that, as the mirror head is swung outwards to its extended position, the mirror head (and reflective element) pivot so as to be pivoted or canted rearward and inward so that the mirror reflective element is angled or canted towards the driver to provide an enhanced viewing angle to the driver, as also discussed below. The adjustment mechanism may be similar to the adjustment mechanism discussed above, such that a detailed discussion of the similar or common features need not be repeated herein.

In the illustrated embodiment, the mounting structure 118 comprises an elongated arm that is pivotally mounted at a base portion 128, which is configured to attach at a side of a vehicle. The base portion of the mirror assembly is mounted at the side of a host or subject vehicle, with the reflective element providing a rearward field of view along the respective side of the vehicle to the driver of the vehicle.

Figure 18:
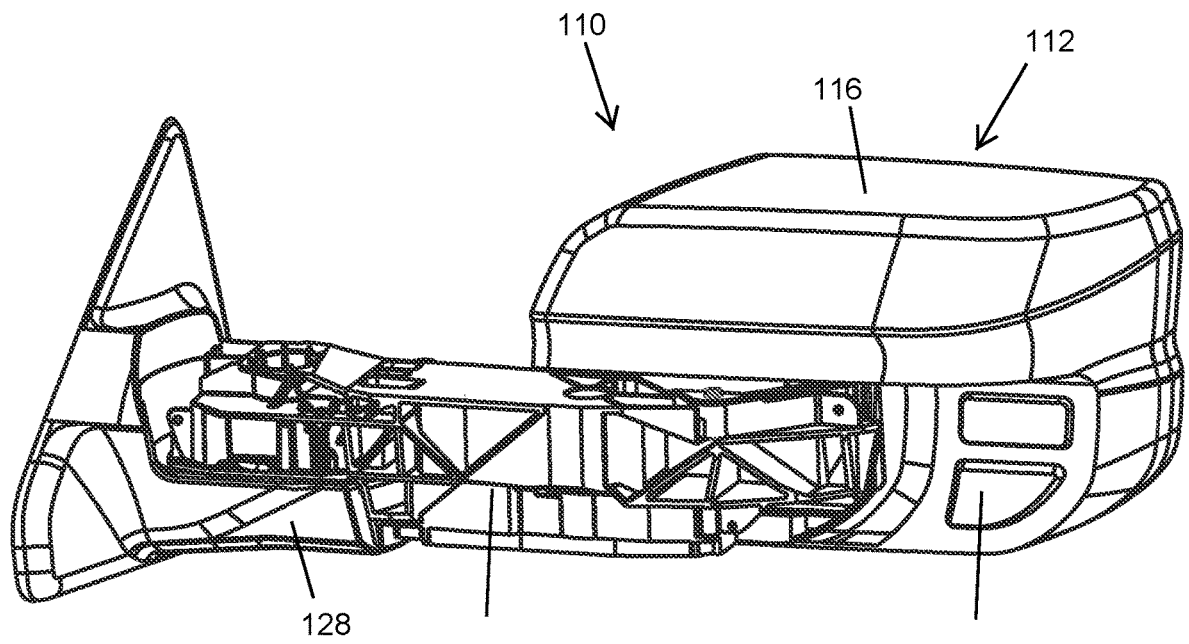
FIG. 18 is another perspective view of the exterior rearview mirror assembly of FIG. 17, shown in its extended state.
Figure 19:
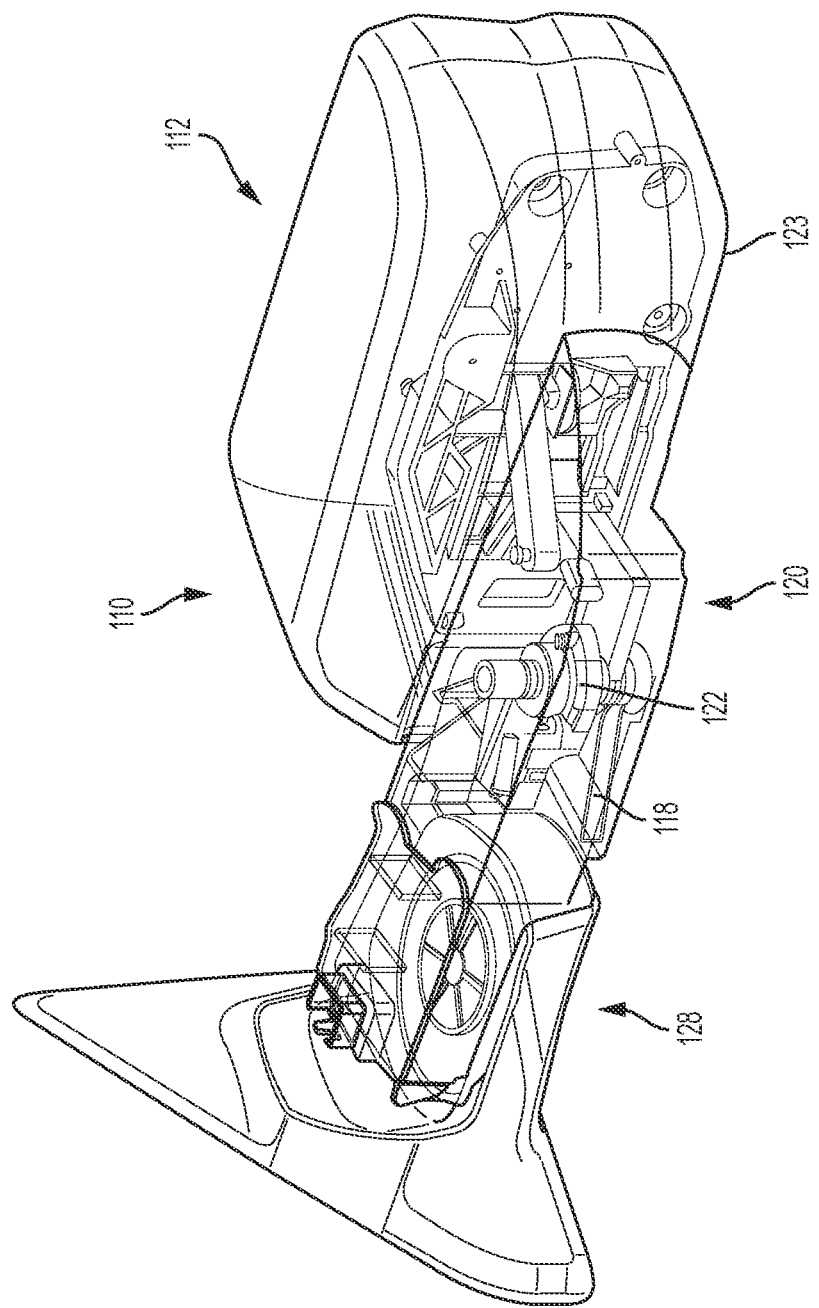
FIG. 19 is another perspective view of the exterior rearview mirror assembly of FIG. 18.
Figure 20:
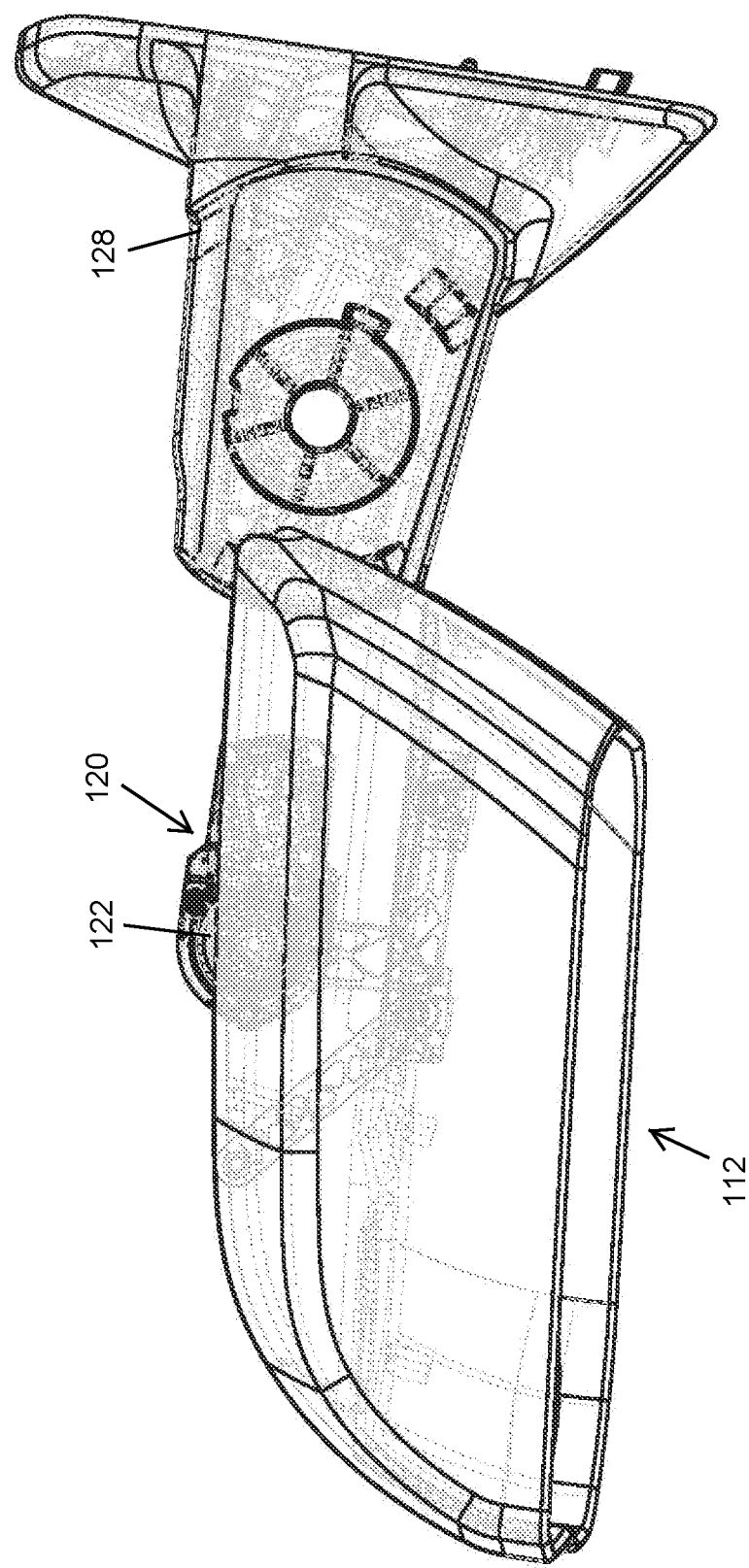
FIG. 20 is a top view of the retracted exterior rearview mirror assembly of FIG. 17.
Figure 35:
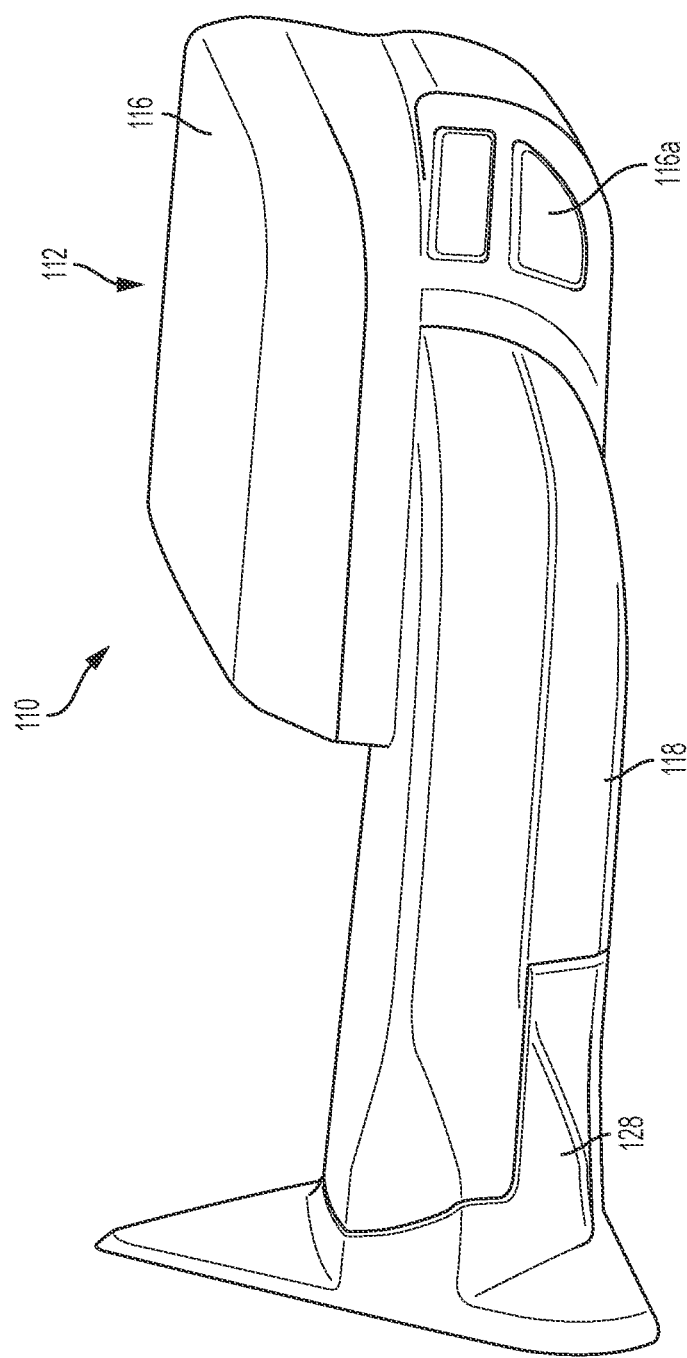
Figure 36:
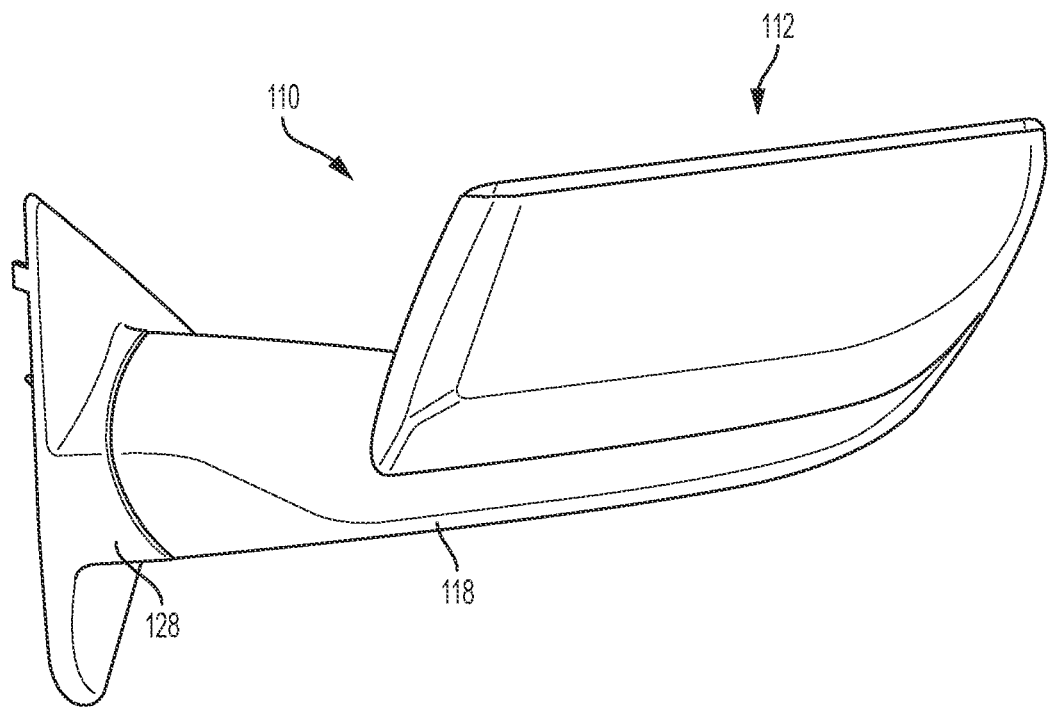
Figure 37:
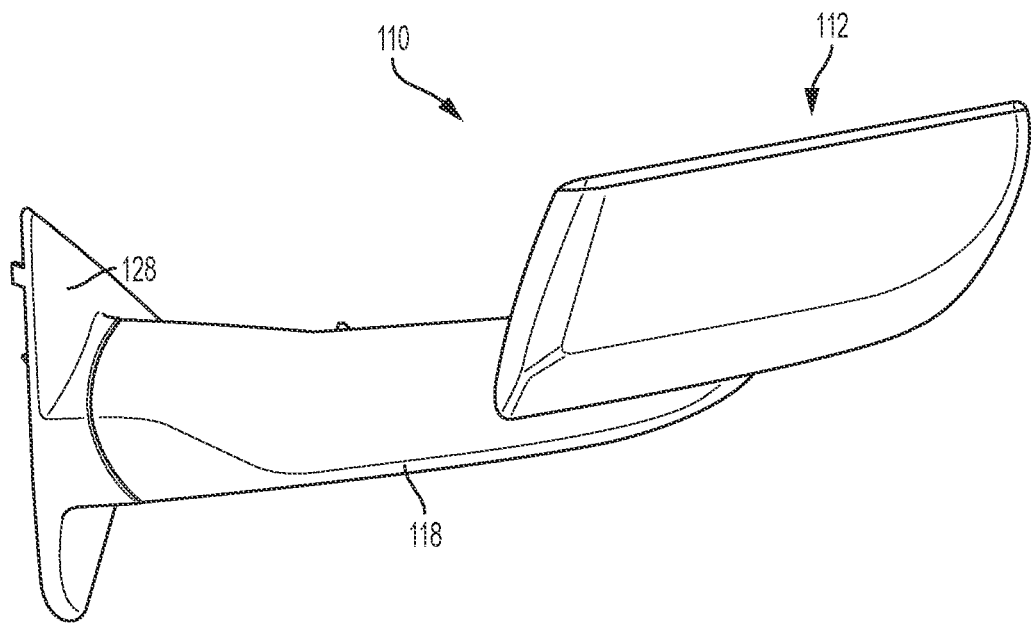
Figure 38:
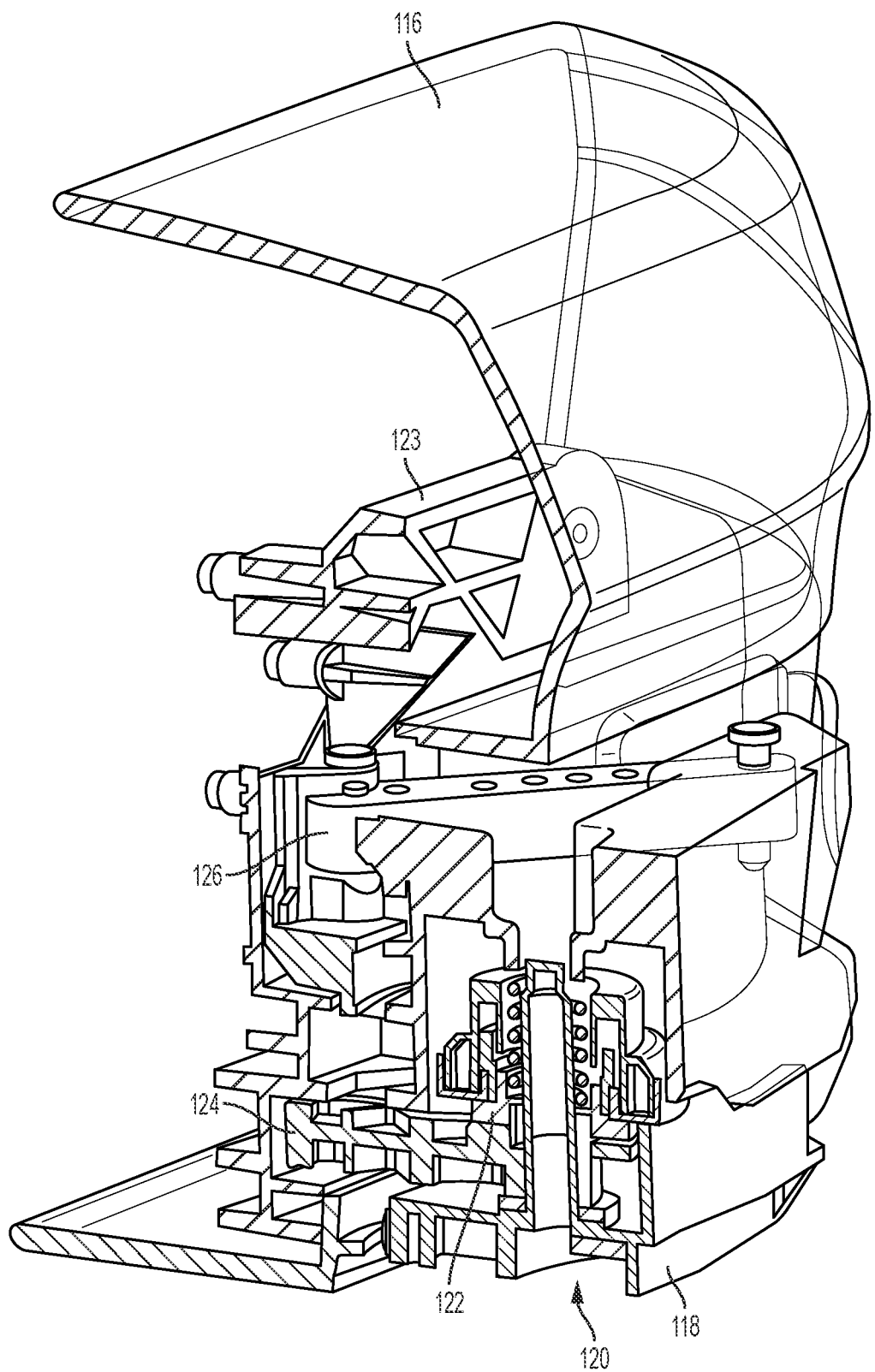
FIG. 38 is a sectional view of the mirror head and bracket and arm of the extended rearview mirror assembly of FIG. 37.

The mounting arm or structure 118 supports or houses the adjustment mechanism 120, and is formed so that the mirror casing of the mirror head engages or nests at the outer portion of the mounting structure when in its retracted position, and extends from the outer portion of the mounting structure when in its extended position. As shown in FIGS. 18 and 35, the rear of the mirror casing 116 may include a channel or contour 116*a* that at least partially receives a portion of the mounting arm 118.

Figure 29:
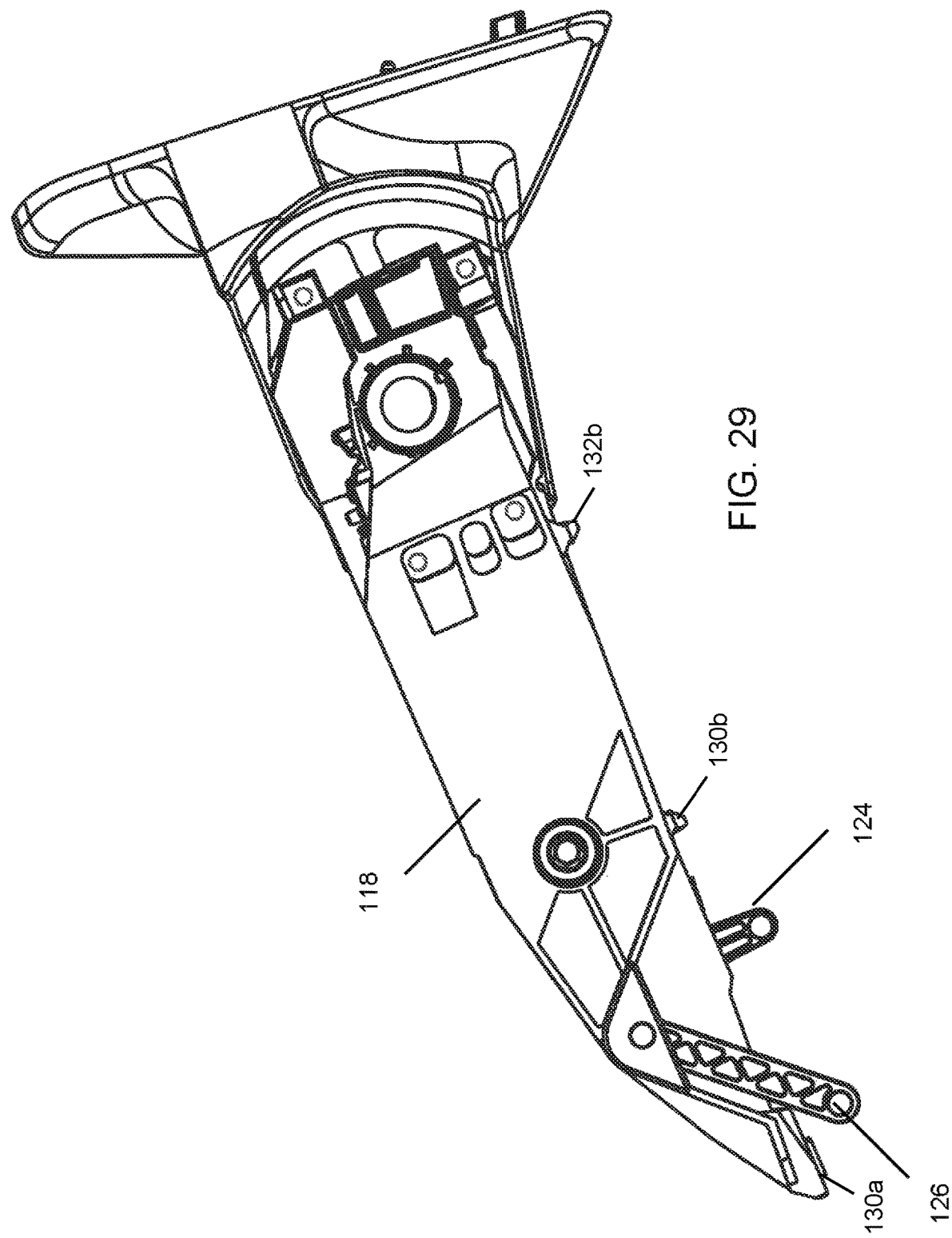
FIG. 29 is a top view of the mounting arm and pivot linkages of FIG. 28, shown with the pivot linkages at the extended state.
Figure 32:
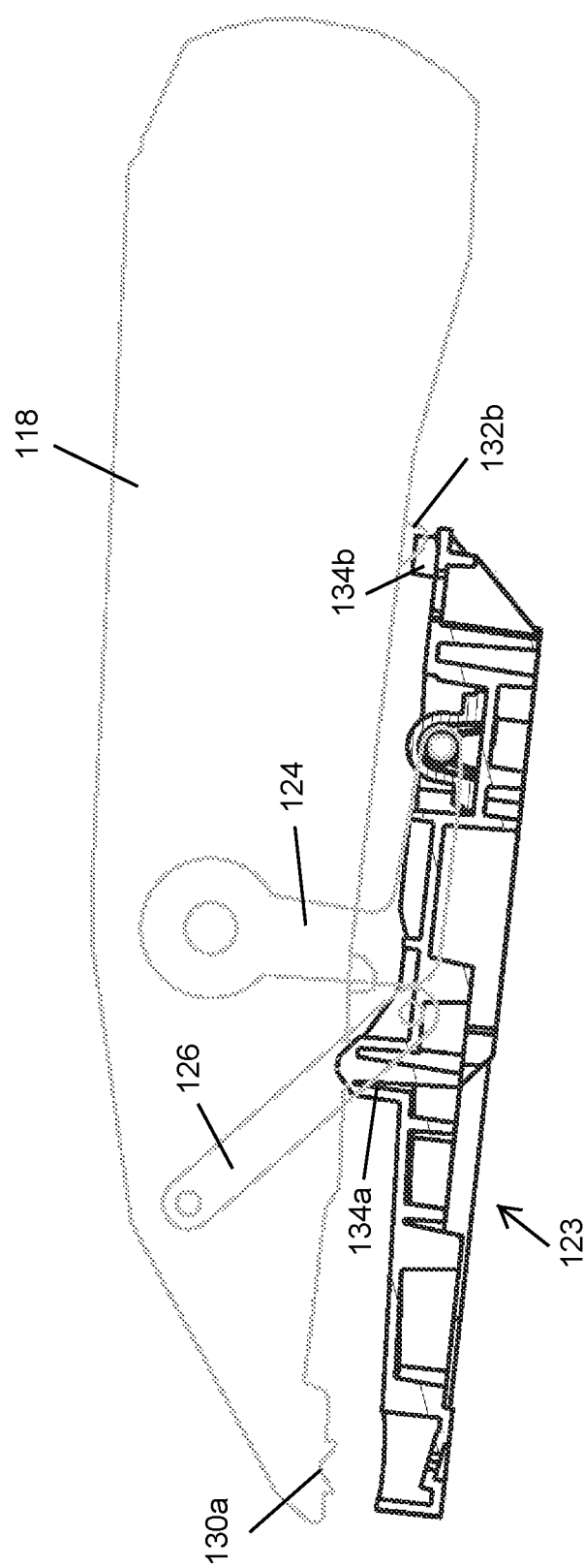
FIG. 32 is a top view of the mounting arm and pivot linkages and bracket sub-assembly of the present invention, shown in the retracted state.
Figure 33:
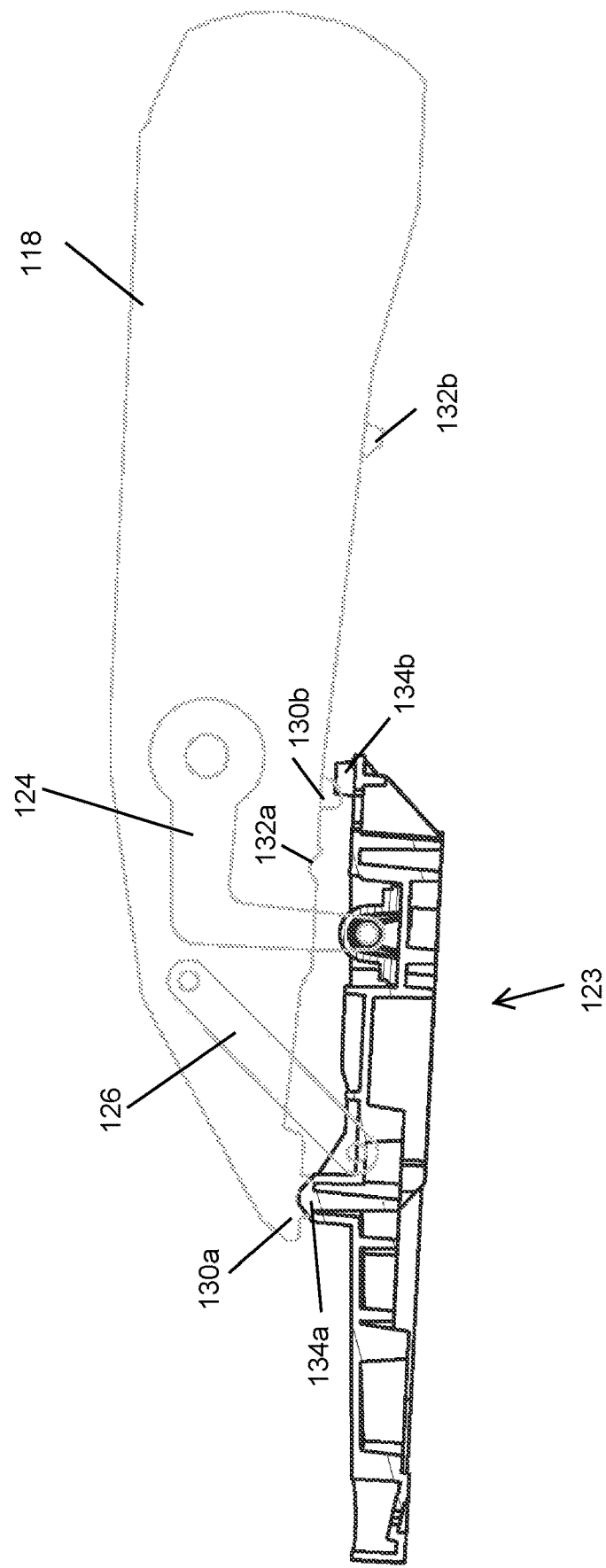
FIG. 33 is a top view of the mounting arm and pivot linkages and bracket sub-assembly of FIG. 32, shown in the extended state.
Figure 34:
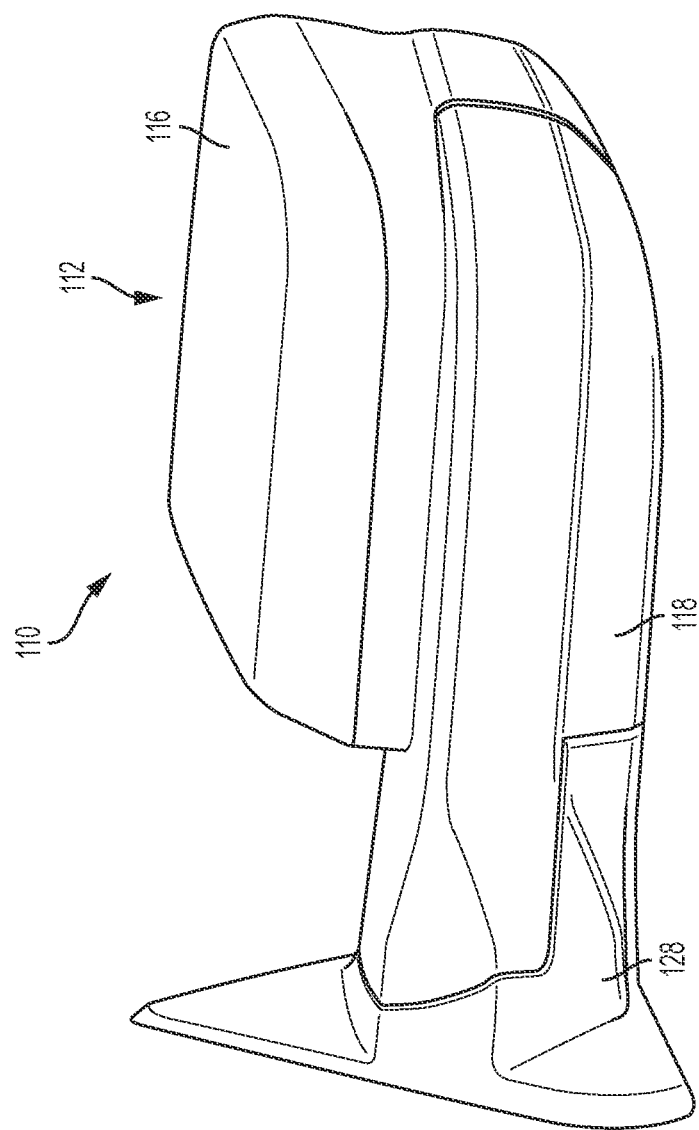
FIGS. 34-37 are other views of the exterior rearview mirror assembly of FIGS. 17-22.

In the illustrated embodiment, the inner linkage 124 comprises an angled link that has about a ninety degree bend such that, when the mirror head is retracted, the outer portion of the link 124 extends generally along the arm 118 and bracket 123 (see FIGS. 28 and 32), and when the mirror head is extended, the outer portion of the link 124 protrudes from the arm 118 (see FIGS. 29 and 33). As shown in FIG. 32, when the mirror head is retracted, the outer portion of the link 124 may be at least partially received in a recess or channel formed along the rear surface of the bracket 123. Thus, as the actuator motor 122 is actuated to pivot link 124 to retract the mirror head, the link 124 pivots or swings the mirror head towards the retracted position and draws the mirror head bracket 123 towards the mounting arm as it approaches the fully retracted position (FIG. 32). Similarly, as the actuator motor 122 is actuated to pivot link 124 to extend the mirror head, the link 124 pivots or swings the mirror head towards the extended position and draws the mirror head bracket 123 towards the mounting arm as it approaches the fully extended position (FIG. 33).

Figure 30:
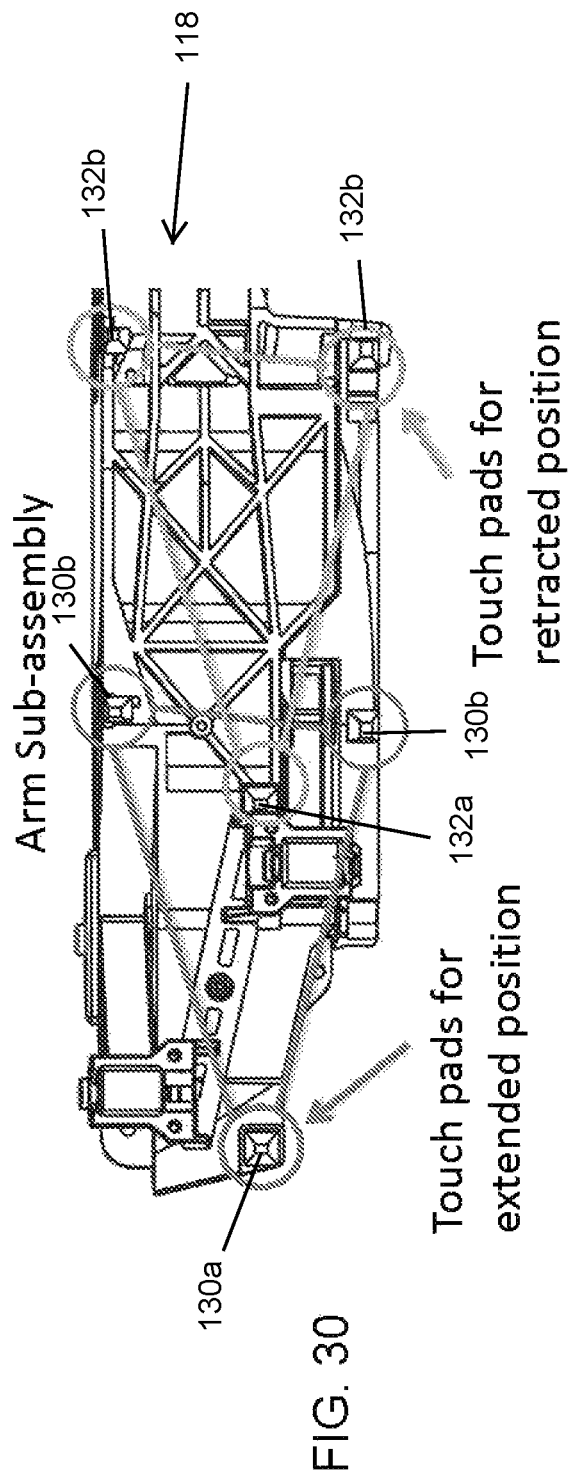
FIG. 30 is a side elevation of a portion of the mounting arm of FIG. 23, showing the touch pads for contacting and mating with the touch pads of the bracket when the bracket and mirror head are at the extended and retracted positions.
Figure 31:
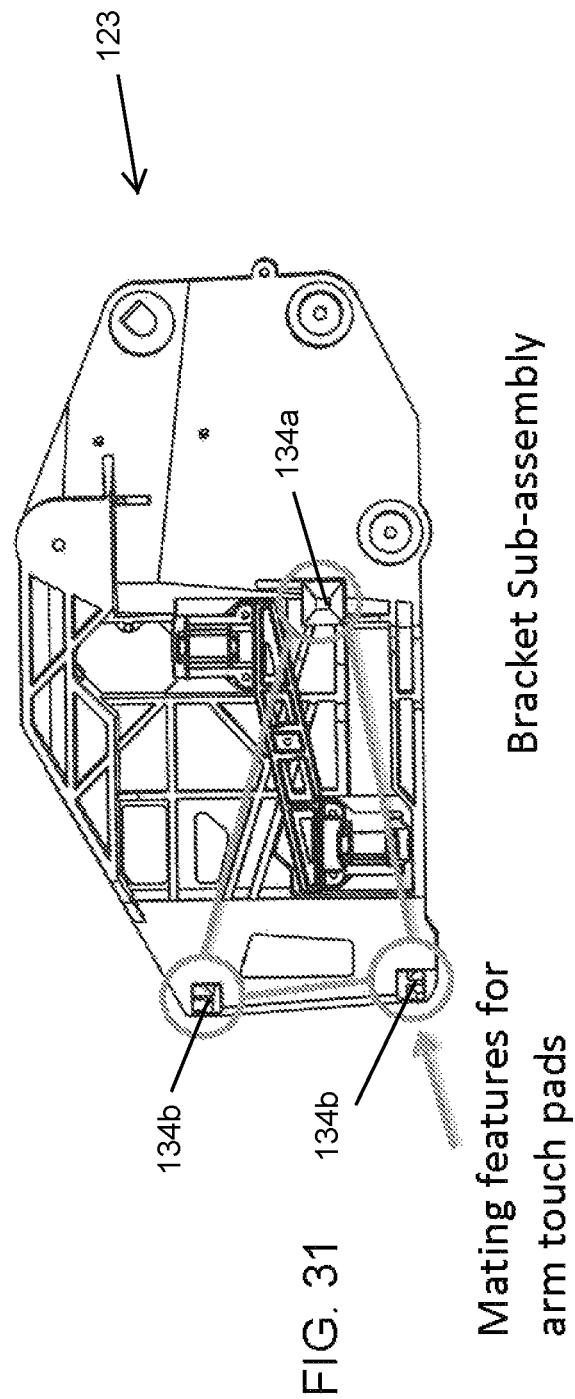
FIG. 31 is a view of the bracket sub-assembly of FIG. 26, showing the touch pads for contacting and mating with the touch pads of the mounting arm when the bracket and mirror head are at the extended and retracted positions.

In the illustrated embodiment, the arm and bracket include touch pads or contact pads or engaging elements that are configured to enhance mating of the bracket 123 at the arm 118 when the mirror head and bracket are fully extended or fully retracted. For example, and such as shown in FIG. 30, the arm includes two sets of touch pads or engaging elements, an outer set (for mating with the bracket touch pads when extended) comprising touch pads or engaging elements 130*a* and 130*b*, and an inner set (for mating with the bracket touch pads when retracted) comprising touch pads or engaging elements 132*a*, 132*b*. As shown in FIG. 31, the bracket 123 includes a single set of touch pads or engaging elements comprising touch pads or engaging elements 134*a*, 134*b*. The touch pads are correspondingly shaped or formed and are ramped to provide enhanced mating as the bracket is moved into engagement with the arm when fully retracted or extended. Thus, and as best shown in FIG. 32, when the bracket 123 (and mirror head) is retracted, touch pad 134*a* of bracket 123 engages and mates with touch pad 132*a* of arm 118 while touch pads 134*b* of bracket 123 engage and mate with touch pads 132*b* of arm 118. Likewise, when the bracket 123 (and mirror head) is extended, touch pad 134*a* engages and mates with touch pad 130*a* of arm 113 while touch pads 134*b* of bracket 123 engage and mate with touch pads 130*b* of arm 118.

The touch pads comprise ramped surfaces that provide stability to the extendable mirror head by providing precise locating features for the head assembly to line up and slide into each time the mirror head is extended or retracted. The ramped design provides solid anchor points for stability in the up/down (vertical) and left/right (lateral) directions. In the illustrated embodiment, the touch pads 130*a*, 132*a* of the mounting arm are configured to partially receive the correspondingly shaped touch pad 134*a* of the bracket, while the touch pads 134*b* of the bracket are configured to partially receive the correspondingly shaped touch pads 130*b*, 132*b* of the mounting arm (although the bracket touch pad 134*a* may at least partially receive the arm touch pads 130*a*, 132*a* and/or the arm touch pads 130*b*, 132*b* may at least partially receive the bracket touch pads 134*b* while remaining with the spirit and scope of the present invention). The three points of engagement assist in guiding and mating the touch pads together as the bracket is moved into the extended or retracted position and limit movement (vertical and lateral movement) of the bracket (and mirror head) relative to the mounting arm when the bracket (and mirror head) is fully extended or retracted.

Thus, when actuated (such as via actuation of a user input by the driver of the vehicle) to move the mirror head from its retracted state to its extended state, the actuator pivots the inboard link 124, which moves the inboard portion of the mirror head, which imparts a corresponding movement of the outboard mounting region for the outboard link, which pivots relative to the mounting arm as the mirror head is moved. The mirror head thus swings or arcuately moves along the path of the outer ends of the links 124, 126 as they pivot about the actuator pivot pin and the outer end mount, respectively. The lengths and configurations of the links 124, 126 are selected such that, as the mirror head swings towards its extended state, the mirror head is angled or pivoted or canted rearward and towards the side of the vehicle. This is accomplished by selecting the mounting locations and stop points (where the mirror ends of the links contact recesses or stops or touch pads at the mounting arm or mirror head bracket) for the links at relative locations so that the links do not pivot as opposite sides of a parallelogram, such that the mirror head (and thus the reflective element) does not stay parallel to its initial location when it is extended.

Figure 22:
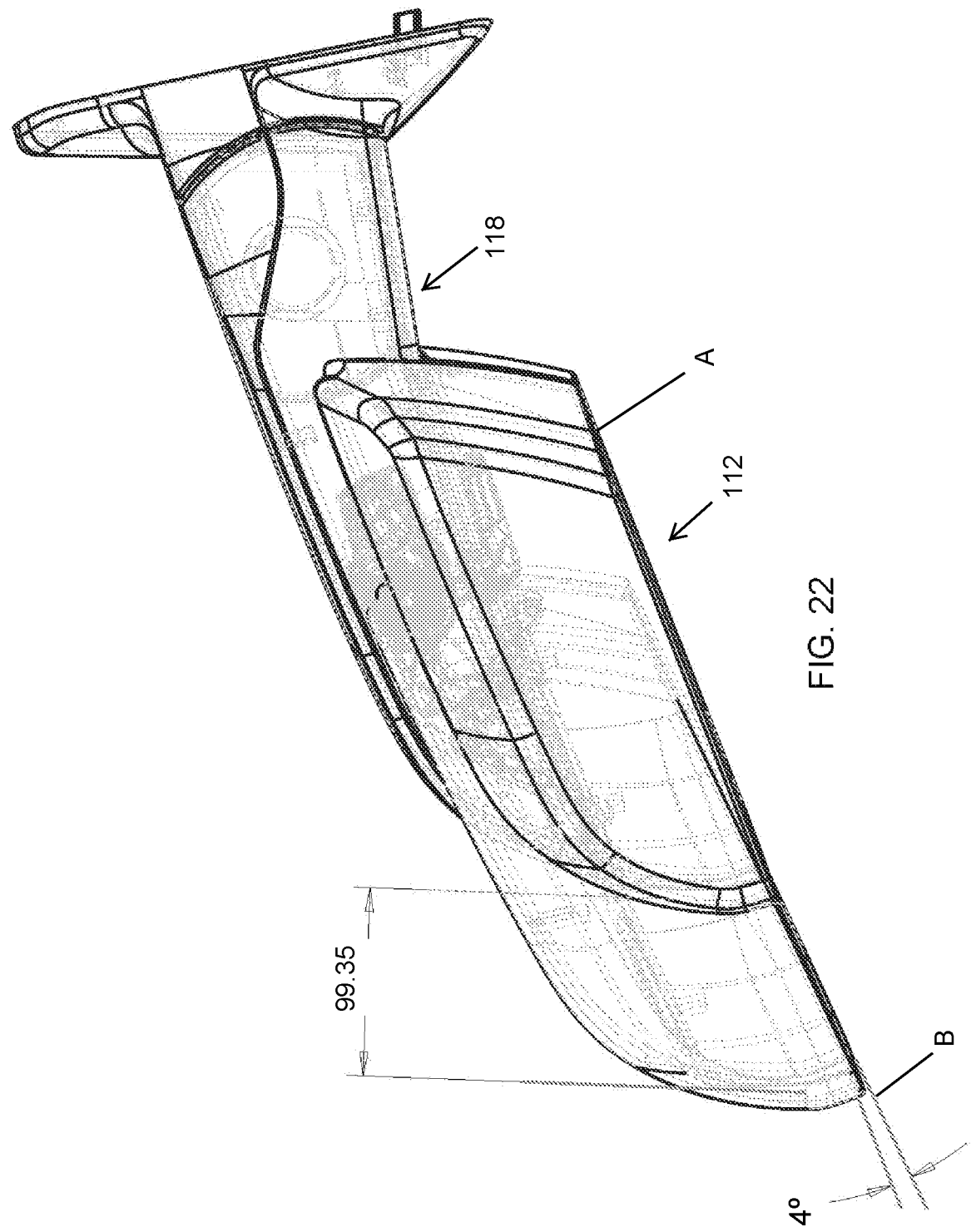
FIG. 22 is a top view of the extended exterior rearview mirror assembly of the present invention, shown in both its retracted and extended states, showing the degree of extension and angular adjustment of the mirror head provided by the extending/retracting mechanism of the present invention.
Figure 25:
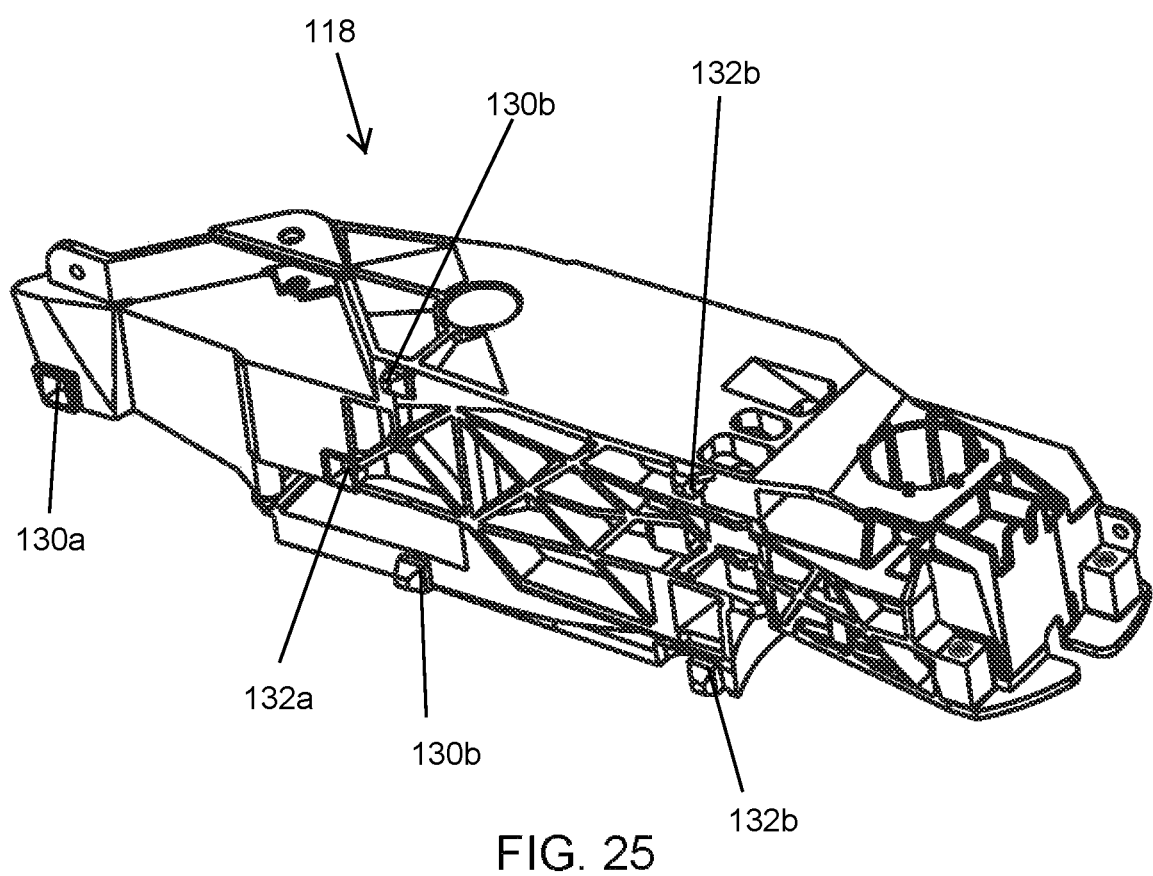
FIG. 25 is a perspective view of the mounting arm of FIGS. 23 and 24.
Figure 26:
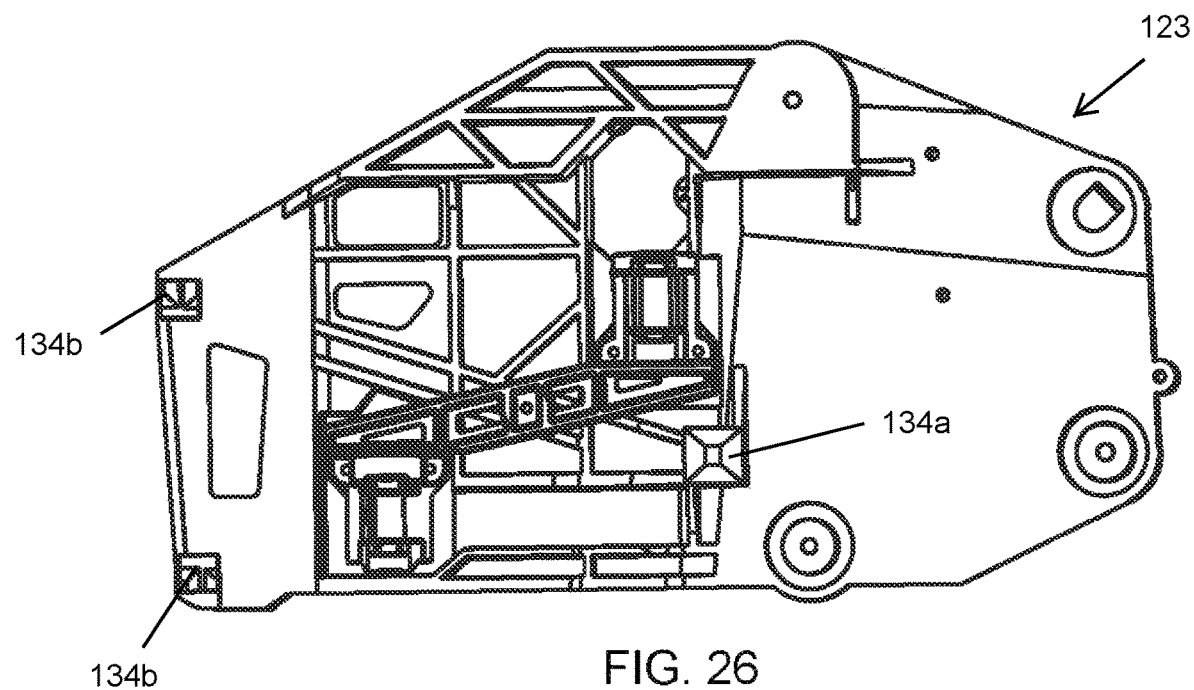
FIGS. 26 and 27 are views of a bracket sub-assembly for attaching the mirror head at the mounting arm of FIG. 25.
Figure 27:
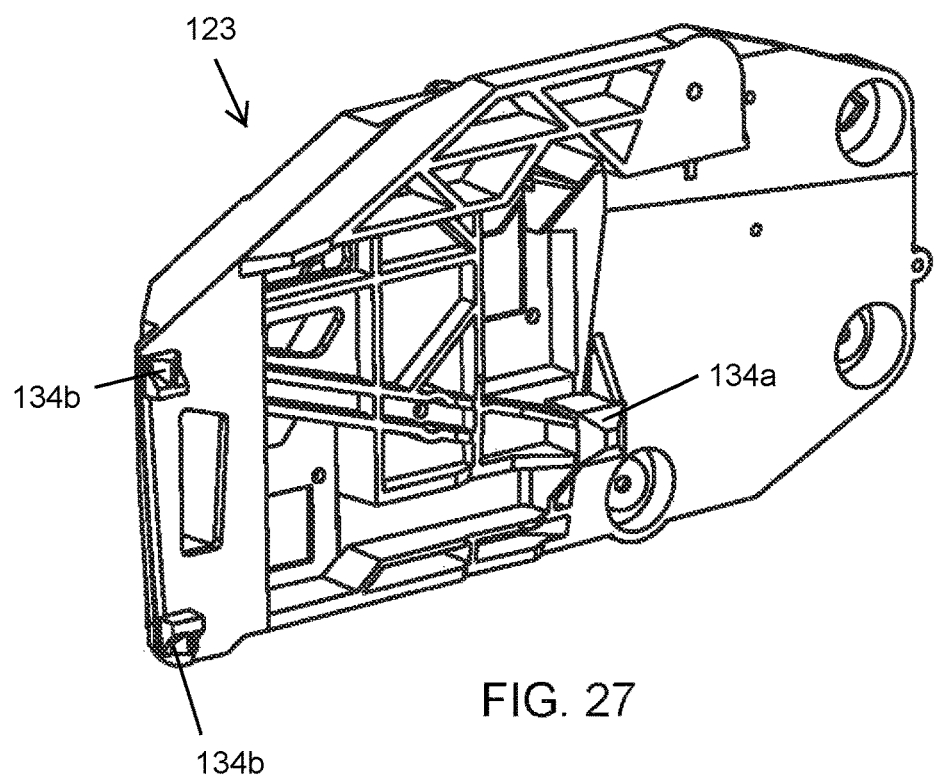
Figure 28:
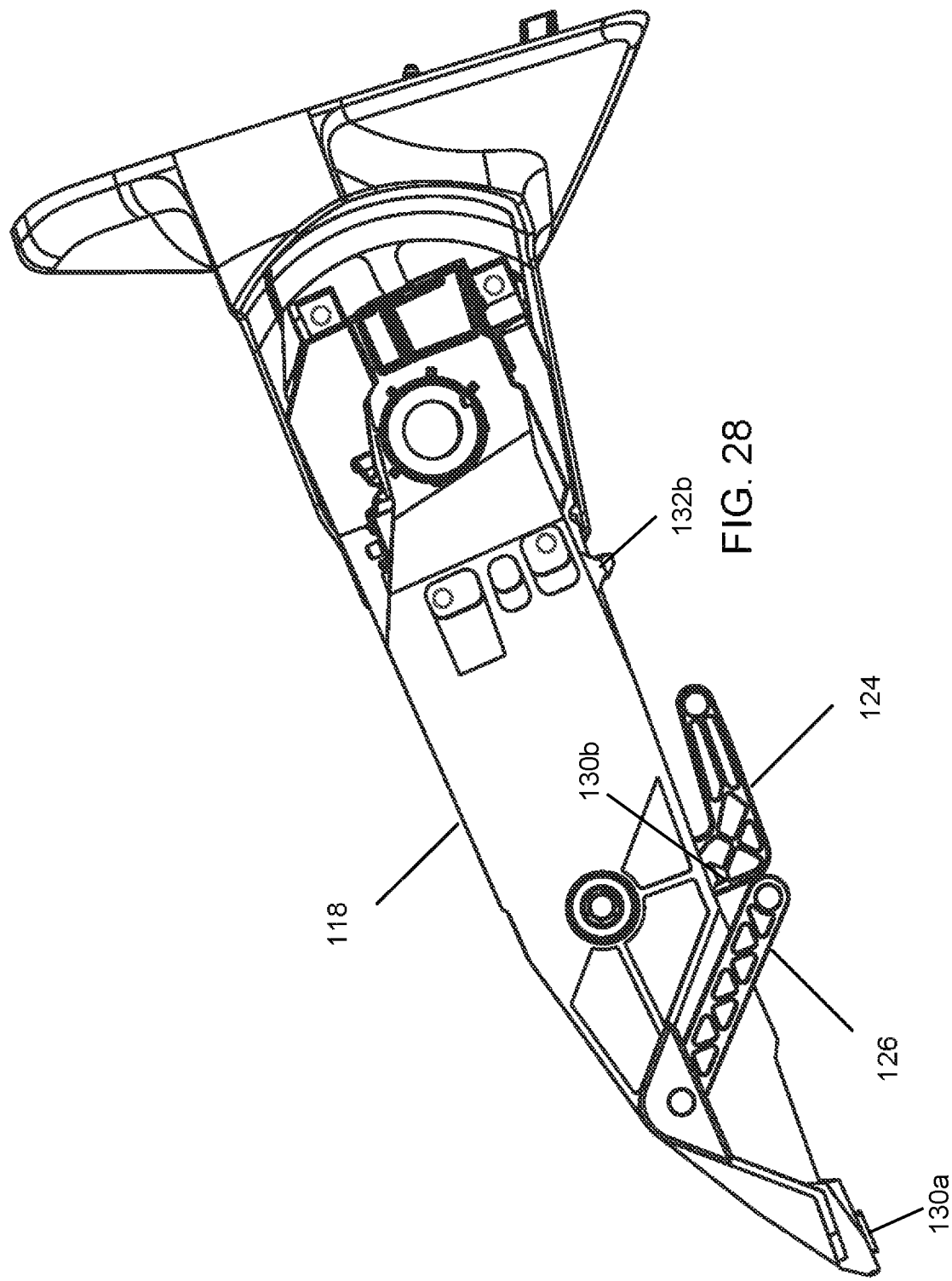
FIG. 28 is a top view of the mounting arm and pivot linkages of the exterior rearview mirror assembly of the present invention, shown with the pivot linkages at the retracted state.

As can be seen with reference to FIG. 22, the plane of the rear face or open end of the mirror casing is at a first angle (see plane or position A in FIG. 22) relative to the side of the vehicle when the mirror head is in its retracted position, and is at a second angle (see plane or position B in FIG. 22) relative to the side of the vehicle when the mirror head is in its extended position (thus the reflective element also is angled with the mirror head, without adjustment of the reflective element via actuation of a mirror actuator in the mirror casing). For example, and such as shown in FIG. 22, the mirror head, when it is extended may move outwards about 100 mm and may be angled or canted towards the side of the vehicle about 4 degrees. However, the degree of head extension and rotation or canting can be adjusted or selected by selecting different lengths for the links and different relative pivot mounting locations of the links, such as different relative mounting locations of the links at the mirror head and/or at the mounting arm.

Thus, the head angle changes when the head assembly transitions between retracted and extended positions. This angle change removes the need for the driver to manually adjust the mirror glass angle. The head angle change can be adjusted by changing the linkage lengths and pivot axis locations.

Optionally, the mirror assembly may allow for manual extension and retraction of the mirror head. For example, the power extend actuator and detent plate may be allowed to float in the Z direction (vertical) to allow for manual operation of the extend function (such as via lifting or lowering the mirror head relative to the mounting arm to disengage the actuator or linkage from a detent and then manually moving the mirror head to the other position and re-engaging the actuator or linkage a the other detent). Allowing the actuator to move relative to the arm/linkage allows manual operation without the usual "lift and turn" motion that is typically required in conventional extendable mirror heads. The present invention thus allows movement only in the swing direction, and substantially limits or precludes any vertical movement of the mirror head relative to the mounting arm (in the up/down direction) for both manual and electrical operation.

The power extend mechanism of the mirror assembly may include backlash control during manual operation. For example, the powerfold actuator may allow for about 2-3 degrees of backlash. The detent positions of the extend mechanism are about 90 degrees apart, and the drive link swing angle provides for tight lockup after manual operation to take up any backlash from the actuator. The drive link swing angle may be approximately equal to the detent angle minus the actuator backlash.

Figure 39:
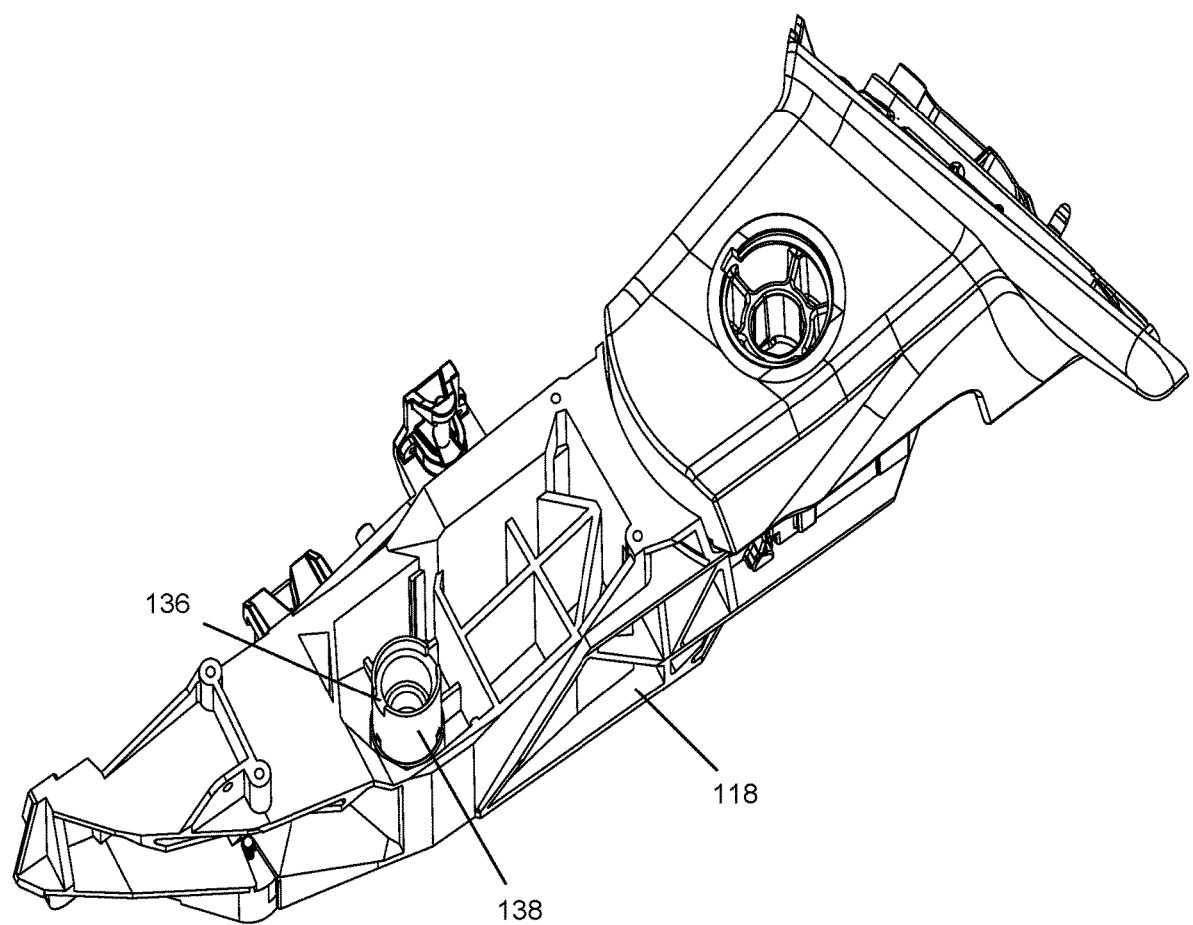
FIG. 39 is a lower perspective view of a lower or bottom portion of the mounting arm of the exterior rearview mirror assembly of the present invention, showing spline and detent features for use with a powered actuator or a manual adjustment mechanism.

Optionally, the adjustment mechanism may comprise a manual adjustment mechanism without an actuator. For example, and as can be seen with reference to FIG. 39, the mounting arm 118 may include spline features or detents 136 formed at a pivot sleeve or passageway 138 formed in the mounting arm (such as at a bottom or lower portion of the mounting arm at or near where the inboard linkage 124 mounts). Thus, for a manual adjustment mechanism, the inboard linkage (not shown in FIG. 39) includes detents or engaging features that engage the detents 136 at the mounting arm 118, whereby when the linkage is lowered to disengage the detents, the linkage (and thus the mirror head) can be pivoted or swung from one of the extended/retracted positions to the other of the extended/retracted positions, whereby the detents may engage to retain the linkage (and the mirror head) at the other location. The manual adjustment mechanism includes a detent spring to bias the detents or engaging features of the inboard linkage and mounting arm into engagement, whereby a user may push or move the mirror head and inboard linkage downward against the spring force to disengage the detents to allow for manual movement of the inboard linkage (and the mirror head) relative to the mounting arm.

Figure 40:
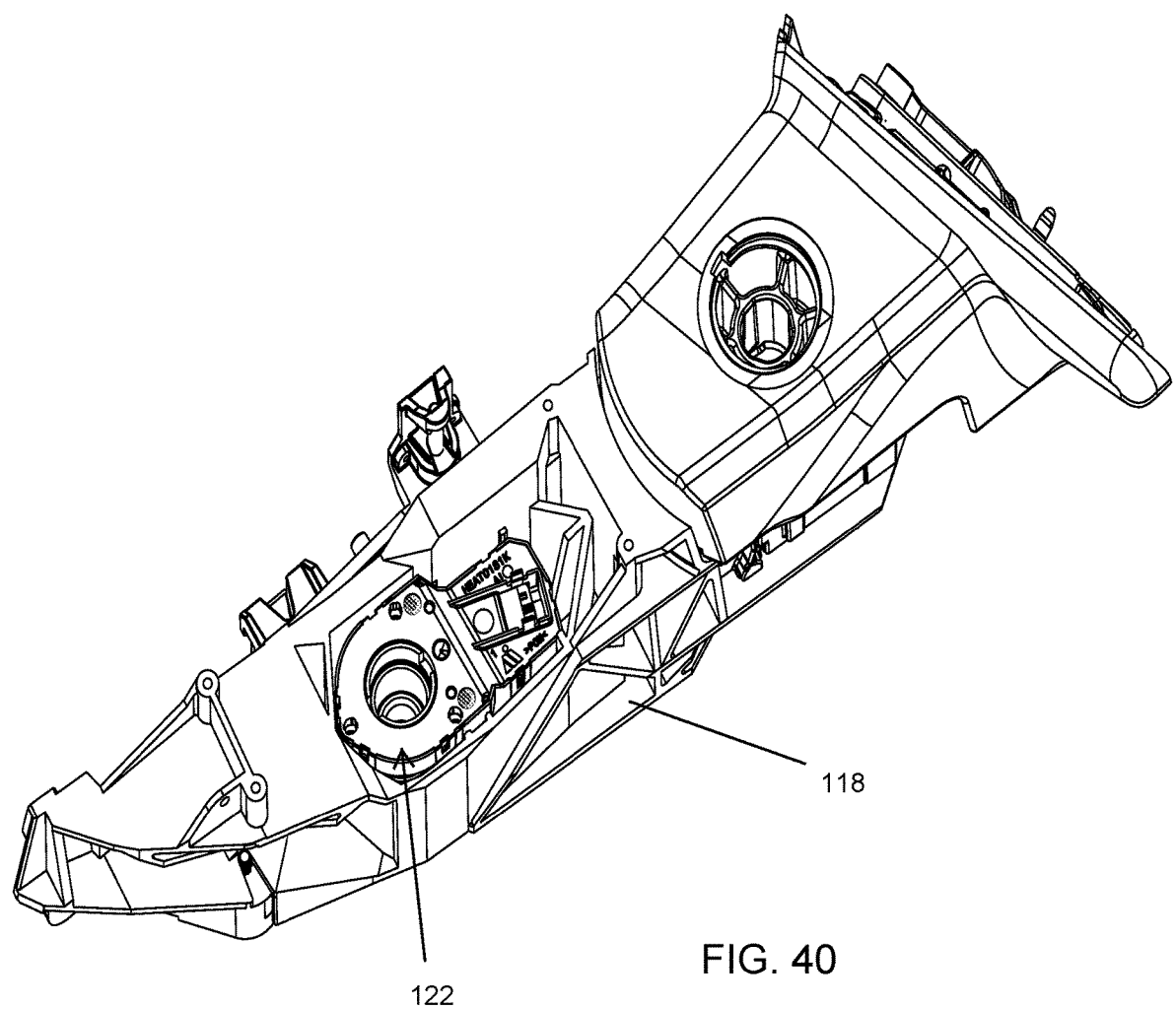
FIG. 40 is a lower perspective view of the lower or bottom portion of the mounting arm of FIG. 39, showing a powered actuator disposed at the spline and detent features.

Optionally, the same configuration of the mounting arm may be provided for a powered extend/retract adjustment mechanism, whereby a powered actuator 122 (see FIG. 40) may be disposed at and engage with the detents at the mounting arm 118. The spline features or detents match the output gear of the actuator to limit or constrain the floating detent plate from axial rotation while allowing vertical movement (to allow for disengagement of the detents and for manual adjustment of the mirror head even with the powered actuator application). The manual extend drop-in feature can either be a separate plastic part that locks into the arm or can be formed as part of the arm (such as via a mold insert applied during the molding of the mounting arm). If the feature is a separate drop-in part, rib features on the mounting arm may be provided to enhance solid constraints in all directions.

Thus, the present invention provides an extension/retraction mechanism or device that is operable to extend or retract or move the mirror head between its retracted and extended positions or states, while also adjusting the angle of the mirror head relative to the side of the vehicle. The mechanism of the present invention thus automatically adjusts the mirror head for enhanced viewing when the mirror head is moved to its extended position, such that the driver does not have to also adjust the mirror reflective element after extending the mirror head (such as is typically needed with known extension devices). The mechanism of the present invention also provides a relatively simple device, which may use a similar actuator as used for the powerfold function.

The mirror assembly may comprise any suitable mirror assembly or structure or housing. Optionally, the mirror assembly may utilize aspects of the mirror assemblies described in U.S. patent application Ser. No. 14/618,159, filed Feb. 10, 2015 and published Aug. 13, 2015 as U.S. Publication No. US-2015-0224930, which is hereby incorporated herein by reference in its entirety.

Optionally, an exterior rearview mirror assembly of the present invention may include a spotter mirror element to provide a wide angle rearward field of view to the driver of the vehicle equipped with the mirror assembly. The spotter mirror element may utilize aspects of the mirrors described in U.S. Pat. Nos. 8,917,437; 7,255,451; 7,195,381; 6,717,712; 7,126,456; 6,315,419; 7,097,312; 6,522,451; 6,315,419; 5,080,492; 5,050,977; 5,033,835; 8,736,940; 8,021,005; 7,934,844; 7,887,204; 7,824,045 and/or 7,748,856, which are hereby incorporated herein by reference in their entireties.

Optionally, an exterior rearview mirror assembly of the present invention may include a turn signal indicator or the like for indicating to drivers of other vehicles that the driver of the equipped vehicle has actuated a turn signal of the vehicle. The turn signal indicator of the exterior rearview mirror assembly may utilize aspects of the mirror systems described in U.S. Pat. Nos. 6,198,409; 5,929,786 and/or 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 8,764,256; 7,581,859; 6,227,689; 6,582,109; 5,371,659; 5,497,306; 5,669,699; 5,823,654; 6,176,602 and/or 6,276,821, and/or International Publication No. WO 2006/124682, and/or U.S. Publication No. US-2013-0242586, and/or U.S. patent application Ser. No. 14/615,821, filed Feb. 6, 2015 and published Aug. 13, 2015 as U.S. Publication No. US-2015-0224919, and/or International Publication No. WO 2006/124682, and/or PCT Application No. PCT/US2015/022398, filed Mar. 25, 2015 and published as International Publication No. WO 2015/148611, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via an object detection or side object or blind spot detection system or the like such as described in U.S. Pat. Nos. 5,550,677; 5,760,962; 6,097,023; 5,796,094; 5,715,093; 7,526,103; 6,250,148; 6,341,523; 6,353,392; 6,313,454; 5,670,935; 6,201,642; 6,396,397; 6,498,620; 6,717,610; 6,757,109; 7,005,974; 7,038,577; 6,882,287; 6,198,409; 5,929,786; 5,786,772; 7,038,577; 6,882,287; 6,198,409; 5,929,786; 5,786,772; 7,881,496 and/or 7,720,580, and/or International Publication Nos. WO 2007/005942 and/or WO 2004/047421, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane.

Optionally, the exterior mirror element of a mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent application Ser. No. 11/779,047, filed Jul. 17, 2007, and published Jan. 17, 2008 as U.S. Pat. Publication Nos. US-2008-0011733 and/or US-2011-0286096, which are hereby incorporated herein by reference in their entireties.

The reflective elements of the mirror assemblies described above may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties.

Optionally, it is envisioned that aspects of the mirror assemblies of the present invention may be suitable for a rearview mirror assembly that comprises a non-electro-optic mirror assembly (such as a generally planar or optionally slightly curved mirror substrate) or an electro-optic or electrochromic mirror assembly. Optionally, the rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the reflective element of the mirror assemblies described herein may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties.

Optionally, the exterior rearview mirror assembly may include an imaging sensor (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 8,786,704; 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, which are all hereby incorporated herein by reference in their entireties. Optionally, for example, the vehicle vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501; WO 2012/0145313; WO 2012/145822; WO 2013/081985; WO 2013/086249 and/or WO 2013/109869, and/or U.S. Publication No. US-2011-0162427, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
   a mirror head having a mirror reflective element;
   a mounting arm configured for attachment at a side of a vehicle, wherein the mirror head is movable along the mounting arm between a retracted position and an extended position, and wherein the mirror head is closer to the side of the vehicle at which the mounting arm is attached when in the retracted position as compared to the extended position;

wherein the mirror head is connected to the mounting arm via at least one link that pivots relative to the mounting arm and the mirror head to move the mirror head along the mounting arm between the retracted position and the extended position;

wherein, with the mounting arm attached at the side of the vehicle, the mirror reflective element is oriented to provide a driver of the vehicle a field of view rearward and sideward of the vehicle (a) when the mirror head is in the retracted position and (b) when the mirror head is in the extended position;

an electrically-operable actuator, wherein electrical operation of the electrically-operable actuator moves the mirror head along the mounting arm between the retracted position and the extended position; and wherein, with the mounting arm attached at the side of the vehicle, and when the mirror head is moved along the mounting arm attached at the side of the vehicle, angle of the mirror head relative to the side of the vehicle at which the vehicular exterior rearview mirror assembly is attached adjusts to provide the driver of the vehicle the field of view rearward and sideward of the vehicle.

2. The vehicular exterior rearview mirror assembly of claim 1, wherein the mirror head comprises a mirror casing having a rear surface, the rear surface comprising a surface of the mirror casing that circumscribes an opening of the mirror casing at which the mirror reflective element is disposed, and wherein, with the mounting arm attached at the side of the vehicle, the rear surface of the mirror head is angled more towards the side of the vehicle rearward of where the mounting arm is attached when the mirror head is in the extended position than when the mirror head is in the retracted position.

3. The vehicular exterior rearview mirror assembly of claim 1, wherein, with the mounting arm attached at the side of the vehicle, the electrically-operable actuator is operable to move the mirror head along the mounting arm in response to a user input, and wherein the user input is actuatable by a driver of the vehicle at which the vehicular exterior rearview mirror assembly is attached.

4. The vehicular exterior rearview mirror assembly of claim 1, wherein the mounting arm is pivotally attached at the side of the vehicle at which the vehicular exterior rearview mirror assembly is attached, and wherein the mounting arm is pivotable via a powerfold actuator that is operable to pivot the mounting arm relative to the side of the vehicle at which the vehicular exterior rearview mirror assembly is attached.

5. The vehicular exterior rearview mirror assembly of claim 1, wherein, with the mounting arm attached at the side of the vehicle, the mirror reflective element provides the driver of the vehicle the same field of view rearward and sideward of the vehicle (a) when the mirror head is in the retracted position and (b) when the mirror head is in the extended position.

6. The vehicular exterior rearview mirror assembly of claim 1, wherein the mounting arm comprises at least one first engaging element and at least one second engaging element, and wherein the mirror head comprises at least one third engaging element, and wherein, when the mirror head is in the retracted position, the at least one third engaging element engages the at least one first engaging element to align and retain the mirror head at the retracted position, and wherein, when the mirror head is in the extended position, the at least one third engaging element engages the at least one second engaging element to align and retain the mirror head at the extended position.

7. The vehicular exterior rearview mirror assembly of claim 6, wherein the at least one first engaging element comprises three first engaging elements, and wherein the at least one second engaging element comprises three second engaging elements, and wherein the at least one third engaging element comprises three third engaging elements.

8. The vehicular exterior rearview mirror assembly of claim 7, wherein the three first engaging elements are non-linearly arranged at the mounting arm.

9. The vehicular exterior rearview mirror assembly of claim 1, wherein the at least one link comprises a first link and a second link that cooperatively pivot relative to the mounting arm and the mirror head to move the mirror head along the mounting arm between the retracted position and the extended position.

10. The vehicular exterior rearview mirror assembly of claim 9, wherein the first link and the second link swing the mirror head through an arcuate path between the retracted position and the extended position.

11. The vehicular exterior rearview mirror assembly of claim 9, wherein, when the mirror head is manually moved to the retracted position, the first link and the second link engage respective first detents to retain the mirror head at the retracted position, and wherein, when the mirror head is manually moved to the extended position, the first link and the second link engage respective second detents to retain the mirror head at the extended position.

12. The vehicular exterior rearview mirror assembly of claim 9, wherein the second link is pivotally connected at the mirror head and at the mounting arm, and wherein operation of the electrically-operable actuator pivots the first link, whereby the mirror head moves along the mounting arm via pivotal movement of the first link and of the second link.

13. The vehicular exterior rearview mirror assembly of claim 12, wherein the electrically-operable actuator is disposed at the mounting arm.

14. The vehicular exterior rearview mirror assembly of claim 12, wherein the first link is not parallel to the second link.

15. The vehicular exterior rearview mirror assembly of claim 9, wherein the first link comprises an inboard link pivotally attached at an inboard portion of the mirror head, and wherein the second link comprises an outboard link pivotally attached at an outboard portion of the mirror head and at an outboard portion of the mounting arm distal from where the mounting arm is attached at the side of the vehicle, and wherein the inboard link is closer to the side of the vehicle at which the mounting arm is attached than the outboard link, and wherein the inboard portion of the mirror head is closer to the side of the vehicle at which the mounting arm is attached than the outboard portion of the mirror head.

16. The vehicular exterior rearview mirror assembly of claim 15, wherein the inboard portion of the mirror head comprises a portion of a mounting bracket of the mirror head, and wherein the outboard portion of the mirror head comprises another portion of the mounting bracket of the mirror head.

17. The vehicular exterior rearview mirror assembly of claim 16, wherein the first link comprises an inner portion and an outer portion, and wherein the outer portion is not parallel to the inner portion, and wherein, when the mirror head is in the retracted position, the outer portion of the first link is parallel to the mounting bracket of the mirror head.

18. A vehicular exterior rearview mirror assembly, the vehicular exterior rearview mirror assembly comprising:

a mirror head having a mirror reflective element;

a mounting arm configured for attachment at a side of a vehicle, wherein the mirror head is movable along the mounting arm between a retracted position and an extended position, and wherein the mirror head is closer to the side of the vehicle at which the mounting arm is attached when in the retracted position as compared to the extended position;

wherein the mirror head is connected to the mounting arm via a first link and a second link that cooperatively pivot relative to the mounting arm and the mirror head to move the mirror head along the mounting arm between the retracted position and the extended position;

wherein, with the mounting arm attached at the side of the vehicle, the mirror reflective element is oriented to provide a driver of the vehicle a field of view rearward and sideward of the vehicle (a) when the mirror head is in the retracted position and (b) when the mirror head is in the extended position;

an electrically-operable actuator, wherein electrical operation of the electrically-operable actuator pivots the first link to move the mirror head along the mounting arm between the retracted position and the extended position;

wherein, with the mounting arm attached at the side of the vehicle, the electrically-operable actuator operates to move the mirror head along the mounting arm in response to a user input that is actuatable by a driver of the vehicle at which the vehicular exterior rearview mirror assembly is attached; and wherein, with the mounting arm attached at the side of the vehicle, and when the mirror head is moved along the mounting arm attached at the side of the vehicle, angle of the mirror head relative to the side of the vehicle at which the vehicular exterior rearview mirror assembly is attached adjusts to provide the driver of the vehicle the field of view rearward and sideward of the vehicle.

19. The vehicular exterior rearview mirror assembly of claim 18, wherein the first link and the second link swing the mirror head through an arcuate path between the retracted position and the extended position.

20. The vehicular exterior rearview mirror assembly of claim 18, wherein, when the mirror head is manually moved to the retracted position, the first link and the second link engage respective first detents to retain the mirror head at the retracted position, and wherein, when the mirror head is manually moved to the extended position, the first link and the second link engage respective second detents to retain the mirror head at the extended position.

21. The vehicular exterior rearview mirror assembly of claim 18, wherein the second link is pivotally connected at the mirror head and at the mounting arm.

22. The vehicular exterior rearview mirror assembly of claim 21, wherein the electrically-operable actuator is disposed at the mounting arm, and wherein the first link is pivotally connected at the mirror head.

23. The vehicular exterior rearview mirror assembly of claim 21, wherein the first link is not parallel to the second link.

24. The vehicular exterior rearview mirror assembly of claim 18, wherein the first link comprises an inboard link pivotally attached at an inboard portion of the mirror head, and wherein the second link comprises an outboard link pivotally attached at an outboard portion of the mirror head and at an outboard portion of the mounting arm distal from where the mounting arm is attached at the side of the vehicle, and wherein the inboard link is closer to the side of the vehicle at which the mounting arm is attached than the outboard link, and wherein the inboard portion of the mirror head is closer to the side of the vehicle at which the mounting arm is attached than the outboard portion of the mirror head.

25. The vehicular exterior rearview mirror assembly of claim 24, wherein the inboard portion of the mirror head comprises a portion of a mounting bracket of the mirror head, and wherein the outboard portion of the mirror head comprises another portion of the mounting bracket of the mirror head.

26. The vehicular exterior rearview mirror assembly of claim 25, wherein the first link comprises an inner portion and an outer portion, and wherein the outer portion is not parallel to the inner portion, and wherein, when the mirror head is in the retracted position, the outer portion of the first link is parallel to the mounting bracket of the mirror head.

27. A vehicular exterior rearview mirror assembly, the vehicular exterior rearview mirror assembly comprising:

a mirror head having a mirror reflective element;

a mounting arm configured for attachment at a side of a vehicle, wherein the mirror head is movable along the mounting arm between a retracted position and an extended position, and wherein the mirror head is closer to the side of the vehicle at which the mounting arm is attached when in the retracted position as compared to the extended position;

wherein the mirror head is connected to the mounting arm via at least one link that pivots relative to the mounting arm and the mirror head to move the mirror head along the mounting arm between the retracted position and the extended position;

wherein, with the mounting arm attached at the side of the vehicle, the mirror reflective element is oriented to provide a driver of the vehicle a field of view rearward and sideward of the vehicle (a) when the mirror head is in the retracted position and (b) when the mirror head is in the extended position;

an electrically-operable actuator, wherein electrical operation of the electrically-operable actuator moves the mirror head along the mounting arm between the retracted position and the extended position;

wherein, with the mounting arm attached at the side of the vehicle, the electrically-operable actuator operates to move the mirror head along the mounting arm in response to a user input that is actuatable by a driver of the vehicle at which the vehicular exterior rearview mirror assembly is attached;

wherein, with the mounting arm attached at the side of the vehicle, and when the mirror head is moved along the mounting arm attached at the side of the vehicle, angle of the mirror head relative to the side of the vehicle at which the vehicular exterior rearview mirror assembly is attached adjusts to provide the driver of the vehicle the field of view rearward and sideward of the vehicle; and wherein, with the mounting arm attached at the side of the vehicle, the mirror reflective element provides the driver of the vehicle the same field of view rearward and sideward of the vehicle (a) when the mirror head is in the retracted position and (b) when the mirror head is in the extended position.

28. The vehicular exterior rearview mirror assembly of claim 27, wherein the mounting arm is pivotally attached at the side of the vehicle at which the vehicular exterior rearview mirror assembly is attached, and wherein the mounting arm is pivotable via a powerfold actuator that is operable to pivot the mounting arm relative to the side of the vehicle at which the vehicular exterior rearview mirror assembly is attached.

29. The vehicular exterior rearview mirror assembly of claim 27, wherein the at least one link comprises a first link and a second link that cooperatively pivot relative to the mounting arm and the mirror head to move the mirror head along the mounting arm between the retracted position and the extended position.

30. The vehicular exterior rearview mirror assembly of claim 29, wherein the first link and the second link swing the mirror head through an arcuate path between the retracted position and the extended position.

31. The vehicular exterior rearview mirror assembly of claim 29, wherein, when the mirror head is manually moved to the retracted position, the first link and the second link engage respective first detents to retain the mirror head at the retracted position, and wherein, when the mirror head is manually moved to the extended position, the first link and the second link engage respective second detents to retain the mirror head at the extended position.

32. The vehicular exterior rearview mirror assembly of claim 29, wherein the second link is pivotally connected at the mirror head and at the mounting arm, and wherein operation of the electrically-operable actuator pivots the first link, whereby the mirror head moves along the mounting arm via pivotal movement of the first link and of the second link.

33. The vehicular exterior rearview mirror assembly of claim 32, wherein the electrically-operable actuator is disposed at the mounting arm.

34. The vehicular exterior rearview mirror assembly of claim 32, wherein the first link is not parallel to the second link.

35. The vehicular exterior rearview mirror assembly of claim 29, wherein the first link comprises an inboard link pivotally attached at an inboard portion of the mirror head, and wherein the second link comprises an outboard link pivotally attached at an outboard portion of the mirror head and at an outboard portion of the mounting arm distal from where the mounting arm is attached at the side of the vehicle, and wherein the inboard link is closer to the side of the vehicle at which the mounting arm is attached than the outboard link, and wherein the inboard portion of the mirror head is closer to the side of the vehicle at which the mounting arm is attached than the outboard portion of the mirror head.

36. The vehicular exterior rearview mirror assembly of claim 35, wherein the inboard portion of the mirror head comprises a portion of a mounting bracket of the mirror head, and wherein the outboard portion of the mirror head comprises another portion of the mounting bracket of the mirror head.

37. The vehicular exterior rearview mirror assembly of claim 36, wherein the first link comprises an inner portion and an outer portion, and wherein the outer portion is not parallel to the inner portion, and wherein, when the mirror head is in the retracted position, the outer portion of the first link is parallel to the mounting bracket of the mirror head.

* * * * *